(12) United States Patent
Lu

(10) Patent No.: US 10,525,675 B2
(45) Date of Patent: *Jan. 7, 2020

(54) POLYMERIC INTERLAYERS AND MULTIPLE LAYER PANELS MADE THEREFROM EXHIBITING ENHANCED PROPERTIES AND PERFORMANCE

(71) Applicant: SOLUTIA INC., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 617 days.

This patent is subject to a terminal disclaimer.

(21) Appl. No.: 15/061,418

(22) Filed: Mar. 4, 2016

(65) Prior Publication Data

US 2017/0253009 A1 Sep. 7, 2017

(51) Int. Cl.
*B32B 3/26* (2006.01)
*B32B 17/06* (2006.01)
(Continued)

(52) U.S. Cl.
CPC ........ *B32B 17/10568* (2013.01); *B32B 3/263* (2013.01); *B32B 7/00* (2013.01); *B32B 7/02* (2013.01); *B32B 17/10036* (2013.01); *B32B 17/10761* (2013.01); *B32B 27/08* (2013.01); *B32B 27/30* (2013.01); *B32B 27/306* (2013.01); *G02B 27/01* (2013.01); *G02B 27/0149* (2013.01); *B32B 2250/03* (2013.01);
(Continued)

(58) Field of Classification Search
CPC ..... Y10T 428/24612; Y10T 428/24479; B32B 17/10568; B32B 3/263; B32B 17/10036; B32B 17/10761; B32B 27/08; B32B 27/30; B32B 2250/03; B32B 2250/246; B32B 2250/40; B32B 2307/102
See application file for complete search history.

(56) References Cited

U.S. PATENT DOCUMENTS 2,282,026 A 5/1942 Bren et al.
2,282,057 A 5/1942 Hopkins et al.
(Continued)

FOREIGN PATENT DOCUMENTS

GB 1123605 A 8/1968
GB 1502771 A 3/1978
(Continued)

OTHER PUBLICATIONS

Notification of Transmittal of the International Search Report and the Written Opinion of the International Searching Authority, or the Declaration dated May 15, 2017 received in International Application No. PCT/US2017/018634.
(Continued)

*Primary Examiner* — Joanna Pleszczynska
(74) *Attorney, Agent, or Firm* — Michelle Bugbee

(57) ABSTRACT

Multiple layer panels including a pair of substrates and an interlayer disposed therebetween are provided. In some cases, the multiple layer panels may utilize substrates having different thicknesses, and such configurations may help reduce glass thickness and overall panel weight. However, panels of the present invention may still exhibit sufficient strength, rigidity, and acoustic performance and can be suitable for use in a wide range of automotive, aeronautical, and/or architectural applications.

15 Claims, 6 Drawing Sheets

(51) Int. Cl.
  *B32B 17/10* (2006.01)
  *B32B 27/08* (2006.01)
  *B32B 27/30* (2006.01)
  *G02B 27/01* (2006.01)
  *B32B 7/00* (2019.01)
  *B32B 7/02* (2019.01)

(52) U.S. Cl.
  CPC ..... *B32B 2250/246* (2013.01); *B32B 2250/40* (2013.01); *B32B 2307/102* (2013.01); *B32B 2307/544* (2013.01); *B32B 2307/546* (2013.01); *B32B 2307/558* (2013.01); *B32B 2605/006* (2013.01); *G02B 2027/0194* (2013.01)

(56) References Cited

U.S. PATENT DOCUMENTS

| | | | |
|---|---|---|---|
| 3,801,423 | A | 4/1974 | Van Laethem |
| 5,728,472 | A | 3/1998 | D'Errico et al. |
| 6,733,872 | B2 | 5/2004 | Nagai |
| 7,510,771 | B2 | 3/2009 | Lu |
| 8,529,813 | B2 | 9/2013 | Bourcier et al. |
| 9,044,919 | B2 | 6/2015 | Offermann et al. |
| 2006/0210776 | A1 | 9/2006 | Lu |
| 2006/0210782 | A1 | 9/2006 | Lu |
| 2009/0098354 | A1 | 4/2009 | Torr |
| 2012/0328843 | A1 | 12/2012 | Cleary |
| 2013/0236711 | A1 | 9/2013 | Lu |
| 2013/0316158 | A1 | 11/2013 | Rehfeld et al. |
| 2014/0065374 | A1 | 3/2014 | Tsuchiya et al. |
| 2014/0363651 | A1* | 12/2014 | Lu .............................. B32B 7/02 428/217 |
| 2015/0111016 | A1 | 4/2015 | Fisher et al. |

FOREIGN PATENT DOCUMENTS

| | | |
|---|---|---|
| JP | 2015051919 A | 3/2015 |
| WO | WO 2015054112 A1 | 4/2015 |

OTHER PUBLICATIONS

Notification of Transmittal of the International Search Report and the Written Opinion of the International Searching Authority, or the Declaration dated May 19, 2017 received in International Application No. PCT/US2017/018631.

Copending U.S. Appl. No. 15/061,448, filed Mar. 4, 2016, Jun Lu.

Wade, B.E., Vinyl Acetal Polymers, in the *Encyclopedia of Polymer Science & Technology*, 3$^{rd}$ ed., vol. 8, pp. 381-399, by (2003).

M. A. Khaleel, et al., Effect of Glazing System Parameters on Glazing System Contribution to a Lightweight Vehicle's Torsional Stiffness and Weight. *International Body and Engineering Conference*, Detroit, (2000) SAE paper No. 2000-01-2719.

* cited by examiner

POLYMERIC INTERLAYERS AND MULTIPLE LAYER PANELS MADE THEREFROM EXHIBITING ENHANCED PROPERTIES AND PERFORMANCE

BACKGROUND

1. Field of the Invention

This disclosure relates to multiple layer panels comprising polymeric sheets and, in particular, to multiple layer panels comprising polymeric sheets suitable for use as single or multiple layer interlayers.

2. Description of Related Art

Poly(vinyl butyral) (PVB) is often used in the manufacture of polymer sheets that can be used as interlayers in multiple layer panels formed by sandwiching the interlayer between two sheets of glass. Such laminated multiple layer panels are commonly referred to as "safety glass" and have use in both architectural and automotive applications. One of the primary functions of the interlayer in a safety glass panel is to absorb energy resulting from impact to the panel without allowing penetration of an object through the glass. The interlayer also helps keep the glass bonded when the applied force is sufficient to break the glass in order to prevent the glass from forming sharp pieces and scattering. Additionally, the interlayer can also provide the laminated panel with a higher sound insulation rating, reduce ultraviolet (UV) and/or infrared (IR) light transmission through the panel, and enhance its aesthetic appeal through the addition of color, textures, etc.

Traditionally, glass panels used in automotive applications employ two glass sheets each having a thickness between 2.0 and 2.3 mm. Most often, these sheets have approximately the same thickness. This type of configuration facilitates both strength and rigidity in the final panel, which, in turn, contributes to the overall mechanical strength and rigidity of the vehicle body. Some estimates attribute up to 30 percent of the overall rigidity of a vehicle to its glass. Thus, the design and rigidity of the multiple layer glass panels used for constructing, for example, the windshield, sun or moon roof, and side and rear windows, of a vehicle are critical not only for the performance of those panels, but also for the overall performance of the vehicle itself.

Recent trends toward more fuel efficient vehicles have brought about demand for lighter weight vehicles. One way of reducing vehicle weight has been to reduce the amount of glass by using thinner glass sheets. For example, for a windshield having a surface area of 1.4 m², reducing the thickness of one of the panels by about 0.5 mm can result in a weight reduction of over 10 percent, all other things being equal.

One approach to thinner multiple layer panels has been to use an "asymmetric" glass configuration, wherein one of the panels is thinner than the other. Thinner glass panels with symmetric configurations have also been used. However, the asymmetric configurations are more often employed and involve using an "outboard" glass panel (i.e., the glass panel facing outside of the vehicle cabin) with a traditional 2.0 mm to 2.3 mm thickness and a thinner "inboard" glass panel (i.e., the glass panel facing the interior of the cabin). This is to ensure adequate strength and impact resistance against rocks, gravel, sand, and other road debris to which the outboard panel would be subjected to during use. Typically, however, these asymmetric panels retain a combined glass thickness of at least 3.7 mm in order to maintain properties such as deflection stiffness, glass bending strength, glass edge strength, glass impact strength, roof strength, and torsional rigidity within acceptable ranges.

Further, because asymmetric configurations are formed by utilizing a thinner inboard glass sheet, the sound insulation properties of these panels are poorer than similar panels utilizing thicker glass. Therefore, in order to minimize road noise and other disturbances within the cabin, interlayers used to form asymmetric multiple layer panels are generally interlayers having acoustic properties (i.e., acoustic interlayers). Conventional, non-acoustic interlayers do not provide sufficient sound insulation for most applications.

Thus, a need exists for a multiple layer glass panel that includes the optimal glass thickness, while still exhibiting sufficient strength, rigidity, and acoustic performance. Desirably, such a panel could be widely used in a variety of automotive, aerospace, and architectural applications.

SUMMARY

One embodiment of the present invention concerns a multiple layer panel comprising: a first substrate having a first nominal thickness; a second substrate having a second nominal thickness, wherein said second nominal thickness is at least 0.1 mm less than said first nominal thickness; and a multiple layer interlayer disposed between and in contact with each of said first and second substrates, wherein said multiple layer interlayer comprises: a first polymer layer comprising a first poly(vinyl acetal) resin and at least one plasticizer; a second polymer layer comprising a second poly(vinyl acetal) resin and at least one plasticizer; and a third polymer layer comprising a third poly(vinyl acetal) resin and at least one plasticizer, wherein said second polymer layer is adjacent to and in contact with each of said first and said third polymer layers such that said second polymer layer is sandwiched between said first and said third polymer layers, wherein said first, said second, and said third poly(vinyl acetal) resins have respective first, second, and third residual hydroxyl contents, wherein at least one of said first and said third residual hydroxyl contents is at least 20 weight percent, and wherein said second residual hydroxyl content is at least 2 weight percent lower than each of said first and said third residual hydroxyl contents, wherein said first, said second, and said third polymer layers have respective first, second, and third glass transition temperatures, and wherein said second glass transition temperature is at least 13° C. lower than each of said first and said third glass transition temperatures, wherein the ratio of said second nominal thickness to said first nominal thickness is in the range of from at least 0.23:1 to less than 1:1 and wherein the sum of said first and said second nominal thicknesses is less than 3.7 mm.

Another embodiment of the present invention concerns a multiple layer panel comprising: a first substrate having a first nominal thickness; a second substrate having a second nominal thickness, wherein said second nominal thickness is at least 0.5 mm less than said first nominal thickness; and a multiple layer interlayer disposed between and in contact with each of said first and second substrates, wherein said multiple layer interlayer comprises: a first polymer layer comprising a first poly(vinyl acetal) resin and at least one plasticizer; a second polymer layer comprising a second poly(vinyl acetal) resin and at least one plasticizer; and a third polymer layer comprising a third poly(vinyl acetal) resin and at least one plasticizer, wherein said second polymer layer is adjacent to and in contact with each of said first and said third polymer layers such that said second polymer layer is sandwiched between said first and said third polymer layers, wherein said first, said second, and said third poly(vinyl acetal) resins have respective first, second, and third residual hydroxyl contents, wherein at least one of said first and said third residual hydroxyl contents is at least 20 weight percent, and wherein said second residual hydroxyl content is at least 2 weight percent lower than each of said first and said third residual hydroxyl contents, wherein the ratio of said second nominal thickness to said first nominal thickness is in the range of at least 0.23:1 to less than 1:1, wherein the sum of the first and second nominal thicknesses is less than 3.7 mm, and wherein said multiple layer panel exhibits a sound transmission loss at the coincident frequency, measured according to ASTM E90, of at least 34 dB.

Yet another embodiment of the present invention concerns a multiple layer panel comprising: a first substrate having a first nominal thickness; a second substrate having a second nominal thickness, wherein said second nominal thickness is less than 1.5 mm; and a multiple layer interlayer disposed between and in contact with each of said first and second substrates, wherein said multiple layer interlayer comprises: a first polymer layer comprising a first poly(vinyl acetal) resin and at least one plasticizer; a second polymer layer comprising a second poly(vinyl acetal) resin and at least one plasticizer; and a third polymer layer comprising a third poly(vinyl acetal) resin and at least one plasticizer, wherein said second polymer layer is adjacent to and in contact with each of said first and said third polymer layers such that said second polymer layer is sandwiched between said first and said third polymer layers, wherein said first, said second, and said third poly(vinyl acetal) resins have respective first, second, and third residual hydroxyl contents, wherein at least one of said first and said third residual hydroxyl contents is at least 20 weight percent, and wherein said second residual hydroxyl content is at least 2 weight percent lower than each of said first and said third residual hydroxyl contents, wherein the ratio of said second nominal thickness to said first nominal thickness is in the range of from at least 0.23:1 to 1:1, and wherein said multiple layer panel exhibits a sound transmission loss at the coincident frequency, measured according to ASTM E90, of at least 34 dB.

BRIEF DESCRIPTION OF THE DRAWINGS

Various embodiments of the present invention are described in detail below with reference to the attached drawing Figures, wherein.

DETAILED DESCRIPTION

Figure 1:
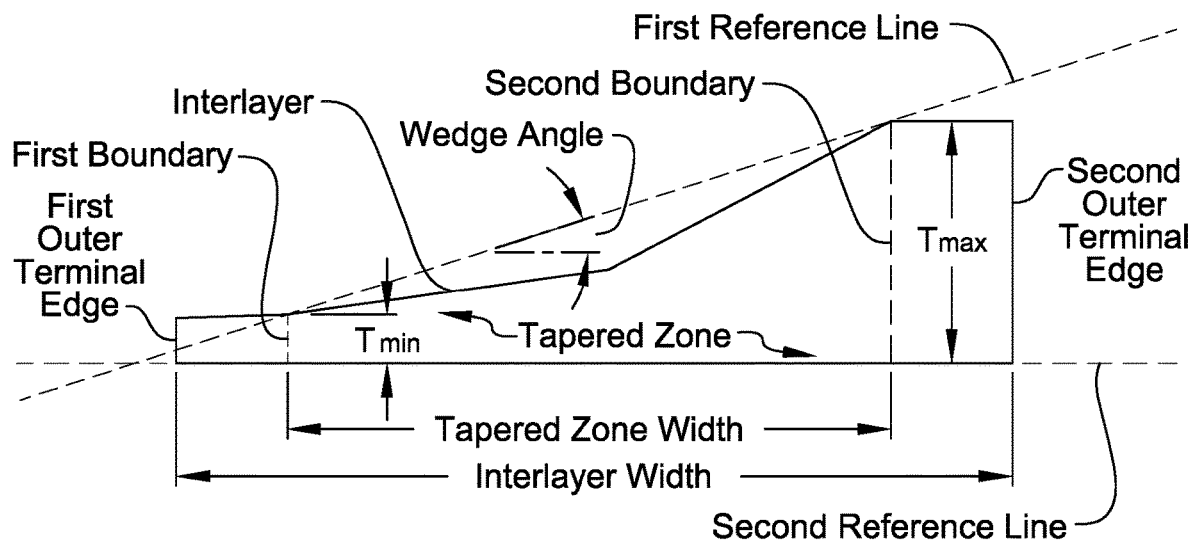
FIG. 1 is a cross-sectional view of a tapered interlayer configured in accordance with one embodiment of the present invention, where various features of the tapered interlayer are labeled for ease of reference.

The present invention relates generally to multiple layer panels that comprise a pair of substrates and an acoustic interlayer laminated therebetween. In some embodiments, the multiple layer panels of the present invention may have an asymmetric glass configuration, such that one of the substrates has a thickness different than the other. Despite this difference in thickness, however, multiple layer panels configured according to embodiments of the present invention may still exhibit sufficient strength, rigidity, and acoustic performance, so that the panels may be employed in a wide range of applications, including a variety of automotive, architectural, and aeronautical applications.

Multiple layer panels as described herein generally comprise at least a first substrate, a second substrate, and an interlayer disposed between and in contact with each of the first and second substrates. Each of the first and second substrates can be formed of a rigid material, such as glass, and may be formed from the same, or from different, materials. In some embodiments, at least one of the first and second substrates can be a glass substrate, while, in other embodiments, at least one of the first and second substrates can be formed of another material including, for example, a rigid polymer such as polycarbonate, acrylic, polyesters, copolyesters, and combinations thereof. Typically, neither of the first or second substrates are formed from softer polymeric materials including thermoplastic polymer materials as described in detail shortly.

In some embodiments, at least one of the first and second substrates may comprise a glass substrate. Any suitable type of glass may be used to form such a substrate, and, in some embodiments, the glass may be selected from the group consisting of alumina-silicate glass, borosilicate glass, quartz or fused silica glass, and soda lime glass. The glass substrate, when used, may be annealed, thermally-strengthened or tempered, chemically-tempered, etched, coated, or strengthened by ion exchange, or it may have been subjected to one or more of these treatments. The glass itself may be rolled glass, float glass, or plate glass. When the first and second substrates are glass substrates, the type of glass used to form each may be the same or it may be different.

The first and second substrates can have any suitable thickness. In some embodiments, the nominal thickness of the first and/or second substrates can be at least about 0.4, at least about 0.5, at least about 0.6, at least about 0.7, at least about 0.8, at least about 0.9, at least about 1.0, at least about 1.1, at least about 1.2, at least about 1.3, at least about 1.4, at least about 1.5, at least about 1.6, at least about 1.7, at least about 1.8, at least about 1.9, at least about 2.0, at least about 2.1, at least about 2.2 mm and/or less than about 3.2, less than about 3.1, less than about 3.0, less than about 2.9, less than about 2.8, less than about 2.7, less than about 2.6, less than about 2.5, less than about 2.4, less than about 2.3, less than about 2.2, less than about 2.1, less than about 2.0, less than about 1.9, less than about 1.8, less than about 1.7, less than about 1.6, less than about 1.5, less than about 1.4, less than about 1.3, less than about 1.2, less than about 1.1, or less than about 1.0 mm.

Additionally, or in the alternative, the first and/or second substrates can have a nominal thickness of at least about 2.3, at least about 2.4, at least about 2.5, at least about 2.6, at least about 2.7, at least about 2.8, at least about 2.9, at least about 3.0 and/or less than about 12.5, less than about 12, less than about 11.5, less than about 11, less than about 10.5, less than about 10, less than about 9.5, less than about 9, less than about 8.5, less than about 8, less than about 7.5, less than about 7, less than about 6.5, less than about 6, less than about 5.9, less than about 5.8, less than about 5.7, less than about 5.6, less than about 5.5, less than about 5.4, less than about 5.3, less than about 5.2, less than about 5.1, less than about 5.0, less than about 4.9, less than about 4.8, less than about 4.7, less than about 4.6, less than about 4.5, less than about 4.4, less than about 4.3, less than about 4.2, less than about 4.1, or less than about 4.0 mm.

According to some embodiments, the multiple layer panel may include two substrates having the same nominal thickness. Such embodiments may be referred to as "symmetric configurations," because the ratio of the nominal thickness of one substrate to the nominal thickness of the other substrate equals 1.

In other embodiments, a multiple layer panel as described herein may include two substrates having different nominal thicknesses. Such embodiments, also referred to as "asymmetric configurations," are characterized in that the ratio of the nominal thickness of the thinner substrate to the nominal thickness of the thicker substrate is less than 1. As used herein, the term "symmetry" refers to the ratio of the nominal thickness of the thinner substrate to the nominal thickness of the thicker substrate. In some embodiments, multiple layer panels as described herein can have a symmetry of at least about 0.20, at least about 0.23, at least about 0.25, at least about 0.30, at least about 0.35, at least about 0.40, at least about 0.45, at least about 0.50, at least about 0.55, at least about 0.60, at least about 0.65, at least about 0.70, at least about 0.75 and/or less than about 1, not more than about 0.99, not more than about 0.97, not more than about 0.95, not more than about 0.90, not more than about 0.85, not more than about 0.80, not more than about 0.75, not more than about 0.70, not more than about 0.65, not more than about 0.60, not more than about 0.55, not more than about 0.50, not more than about 0.45, not more than about 0.40, not more than about 0.35, not more than about 0.30.

When the multiple layer panel has an asymmetric configuration, the difference between the nominal thickness of the thicker substrate and the nominal thickness of the thinner substrate can be at least about 0.1 mm. In some embodiments, the nominal thickness of the thicker substrate can be at least about 0.2, at least about 0.3, at least about 0.4, at least about 0.5, at least about 0.6, at least about 0.7, at least about 0.8 mm thicker than the nominal thickness of the thinner substrate. Additionally, or in the alternative, the nominal thickness of the thicker substrate can be not more than about 7, not more than about 6, not more than about 5, not more than about 4, not more than about 3, not more than about 2, not more than about 1.5, not more than about 1, not more than about 0.9, not more than about 0.8, not more than about 0.7, not more than about 0.6, not more than about 0.5, not more than about 0.4, or not more than about 0.3 mm thicker than the nominal thickness of the thinner substrate.

The sum of the nominal thicknesses of the first and second substrates, respectively (also referred to herein as the "combined glass thickness") can be thinner than, or thicker than, conventional multiple layer panels. Typically, conventional commercially-available multiple layer panels have combined glass thicknesses in the range of from 3.7 mm to 4.6 mm. In contrast, according to some embodiments of the present invention, the sum of the nominal thicknesses of the first and second substrates can be less than 3.7, less than about 3.6, less than about 3.5, less than about 3.4, less than about 3.3, or less than about 3.2 mm. In all cases, the sum of the nominal thicknesses of the first and second substrates can be at least about 0.9, at least about 1.2, at least about 1.5, at least about 2.0, at least about 2.5, at least about 3.0, at least about 3.1, at least about 3.2 mm, at least about 3.3, at least about 3.4, or at least about 3.5 mm.

Alternatively, or in addition, the sum of the nominal thicknesses of the first and second substrates can be greater than 4.6, greater than about 4.7, greater than about 4.8, greater than about 4.9, greater than about 5.0, greater than about 5.2, greater than about 5.5, greater than about 5.7, greater than about 6.0, greater than about 6.2, greater than about 6.5, greater than about 6.7, greater than about 7.0, greater than about 7.2, greater than about 7.5, greater than about 7.7, greater than about 8.0, greater than about 8.2, greater than about 8.5, greater than about 8.7, greater than about 9.0, greater than about 9.5, greater than about 10.0, greater than about 10.5, greater than about 11.0, greater than about 11.5, greater than about 12.0, greater than about 12.5, greater than about 13.0, greater than about 13.5, greater than about 14.0, greater than about 14.5, or greater than about 15.0 mm.

The specific glass configuration may be selected depending on the ultimate end use of the multiple layer panel. For example, in some embodiments wherein the multiple layer panel is utilized in automotive applications, the nominal thickness of one of the substrates can be in the range of from 0.4 to 1.8 mm, from 0.5 to 1.7 mm, or from 0.6 to 1.4 mm, while the nominal thickness of the other substrate can have a nominal thickness in the range of from 0.5 to 2.9 mm, from 0.6 to 2.8 mm, from 1.0 to 2.4, or from 1.6 to 2.4 mm. The sum of the thicknesses of the substrates can be less than 3.7, less than 3.6, less than 3.5, or less than 3.4 mm, and the ratio of the nominal thickness of the thinner substrate to the nominal thickness of the thicker substrate can be in the range of from 0.23 to less than 1, from 0.25 to 0.75, or from 0.3 to 0.60.

In other embodiments wherein the multiple layer panel is utilized in aeronautical or architectural applications, the nominal thickness of one of the substrates may be in the range of from 2.2 to 12.5 mm, from 2.6 to 8 mm, or from 2.8 to 5 mm, while the nominal thickness of the other substrate may be in the range of from 1.6 to 12.4 mm, from 1.8 to 7.5 mm, or from 2.3 to 5 mm. The sum of the thicknesses of the substrates in these embodiments can be greater than 4.7 mm, greater than 5 mm, greater than 5.5 mm, or greater than 6 mm, with a symmetry in the range of from 0.23 to less than 1, from 0.25 to 0.75, or from 0.3 to 0.60.

In addition to the substrates, multiple layer panels as described herein include at least one polymeric interlayer disposed between and in contact with each of the first and second substrates. As used herein, the term "interlayer" refers to a single or multiple layer polymer sheet suitable for use in forming multiple layer panels. As used herein, the terms "single layer" and "monolithic" refer to interlayers formed of one single polymer layer, while the terms "multiple layer" or "multilayer" refer to interlayers having two or more polymer layers adjacent to and in contact with one another. Each polymer layer of an interlayer may include one or more polymeric resins, optionally combined with one or more plasticizers, which have been formed into a sheet by any suitable method. One or more of the polymer layers in an interlayer may further include additional additives, although these are not required.

Examples of suitable thermoplastic polymers can include, but are not limited to, poly(vinyl acetal) resins, polyurethanes (PU), poly(ethylene-co-vinyl acetate) resins (EVA), polyvinyl chlorides (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, one or more layers of a multiple layer interlayer can include a thermoplastic polymer can be selected from the group consisting of poly(vinyl acetal) resins, polyvinyl chloride, and polyurethanes. In certain embodiments, one or more of the polymer layers can include at least one poly(vinyl acetal) resin. Although generally described herein with respect to poly (vinyl acetal) resins, it should be understood that one or more of the above polymer resins could be included with, or in the place of, the poly(vinyl acetal) resins described below in accordance with various embodiments of the present invention.

Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inca of Woburn, Mass.). EVA polymers can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to, PVB//PVB//PVB and PVnB//PVisoB//PVnB, where the PVB (polyvinyl butyral), PVnB (polyvinyl n-butyral) and/or PVisoB (polyvinyl iso-butyral) layers comprise a single resin or two or more resins having different residual hydroxyl contents or different polymer compositions; PVC//PVB//PVC, PU//PVB//PU, Ionomer//PVB//Ionomer, Ionomer//PU//Ionomer, Ionomer//EVA//Ionomer, Ionomer//Ionomer//Ionomer, where the core layer PVB (including PVisoB), PU, EVA or ionomer comprises a single resin or two or more resins having different glass transitions. Alternatively, the skin and core layers may all be PVB, PVnB and/or PVisoB using the same or different starting resins. Other combinations of resins and polymers will be apparent to those skilled in the art. In general, PVB resin refers to PVnB or PVisoB or combinations of PVnB and PVisoB.

Thermoplastic polymer resins may be formed by any suitable method. When the thermoplastic polymer resins include poly(vinyl acetal) resins, such resins may be formed by acetalization of poly(vinyl alcohol) with one or more aldehydes in the presence of a catalyst according to known methods such as, for example, those described in U.S. Pat. Nos. 2,282,057 and 2,282,026, as well as "Vinyl Acetal Polymers," in the *Encyclopedia of Polymer Science & Technology*, $3^{rd}$ ed., Volume 8, pages 381-399, by B. E. Wade (2003). The resulting poly(vinyl acetal) resins may include at least about 50, at least about 60, at least about 70, at least about 75, at least about 80, at least about 85, at least about 90 weight percent of residues of at least one aldehyde, measured according to ASTM D-1396 as the percent acetalization of the resin. The total amount of aldehyde residues in a poly(vinyl acetal) resin can be collectively referred to as the acetal content, with the balance of the poly(vinyl acetal) resin being residual hydroxyl groups (as vinyl hydroxyl groups) and residual ester groups (as vinyl acetate groups), which will be discussed in further detail below.

Suitable poly(vinyl acetal) resins may include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde, 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least about 20, at least about 30, at least about 40, at least about 50, at least about 60, or at least about 70 weight percent of residues of at least one $C_4$ to $C_8$ aldehyde, based on the total weight of aldehyde residues of the resin. Alternatively, or in addition, the poly(vinyl acetal) resin may include not more than about 99, not more than about 95, not more than about 90, not more than about 85, not more than about 80, not more than about 75, not more than about 70, or not more than about 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

In other embodiments, the poly(vinyl acetal) resin may comprise residues of other aldehydes, including, but not limited to, cinnamaldehyde, hexylcinnamaldehyde, benzaldehyde, hydrocinnamaldehyde, 4-chlorobenzaldehyde, 4-t-butylphenylacetaldehyde, propionaldehyde, 2-phenylpropionaldehyde, and combinations thereof, alone or in combination with one or more of the $C_4$ to $C_8$ aldehydes described herein.

In various embodiments, the poly(vinyl acetal) resin may be a poly(vinyl butyral) (PVB) resin that primarily comprises residues of n-butyraldehyde, and may, for example, include not more than about 30, not more than about 20, not more than about 10, not more than about 5, not more than about 2, or not more than 1 weight percent of residues of an aldehyde other than n-butyraldehyde. Typically, the aldehyde residues other than n-butyraldehyde present in poly(vinyl butyral) resins may include iso-butyraldehyde, 2-ethylhexyl aldehyde, and combinations thereof. When the poly(vinyl acetal) resin comprises a poly(vinyl butyral) resin, the weight average molecular weight of the resin can be at least about 30,000, at least about 50,000, at least about 80,000, at least about 100,000, at least about 130,000, at least about 150,000, at least about 175,000, at least about 200,000, at least about 300,000, or at least about 400,000 Daltons, measured by size exclusion chromatography using low angle laser light scattering (SEC/LALLS) method of Cotts and Ouano.

In general, poly(vinyl acetal) resins can be produced by hydrolyzing a poly(vinyl acetate) to poly(vinyl alcohol), and then acetalizing the poly(vinyl alcohol) with one or more of the above aldehydes to form a poly(vinyl acetal) resin. In the process of hydrolyzing the poly(vinyl acetate), not all the acetate groups are converted to hydroxyl groups, and, as a result, residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. As used herein, the terms "residual hydroxyl content" and "residual acetate content" refer to the amount of hydroxyl and acetate groups, respectively, that remain on a resin after processing is complete. Both the residual hydroxyl content and the residual acetate content are expressed in weight percent, based on the weight of the polymer resin, and are measured according to ASTM D-1396.

The poly(vinyl acetal) resins utilized in one or more polymer layers as described herein may have a residual hydroxyl content of at least about 8, at least about 9, at least about 10, at least about 11, at least about 12, at least about 13, at least about 14, at least about 15, at least about 16, at least about 17, at least about 18, at least about 18.5, at least about 19, at least about 20, at least about 21, at least about 22, at least about 23, at least about 24, at least about 25, at least about 26, at least about 27, at least about 28, at least about 29, at least about 30, at least about 31, at least about 32, or at least about 33 weight percent. Additionally, or in the alternative, the poly(vinyl acetal) resin or resins utilized in polymer layers of the present invention may have a residual hydroxyl content of not more than about 45, not more than about 43, not more than about 40, not more than about 37, not more than about 35, not more than about 34, not more than about 33, not more than about 32, not more than about 31, not more than about 30, not more than about 29, not more than about 28, not more than about 27, not more than about 26, not more than about 25, not more than about 24, not more than about 23, not more than about 22, not more than about 21, not more than about 20, not more than about 19, not more than about 18.5, not more than about 18, not more than about 17, not more than about 16, not more than about 15, not more than about 14, not more than about 13, not more than about 12, not more than about 11, or not more than about 10 weight percent.

In some embodiments, one or more polymer layers can include at least one poly(vinyl acetal) resin having a residual hydroxyl content of at least about 20, at least about 21, at least about 22, at least about 23, at least about 24, at least about 25, at least about 26, at least about 27, at least about 28, at least about 29, or at least about 30 weight percent and/or not more than about 45, not more than about 43, not more than about 40, not more than about 37, not more than about 35, not more than about 34, not more than about 33, or not more than about 32 weight percent.

In some embodiments, one or more polymer layers can include at least one poly(vinyl acetal) resin having a residual hydroxyl content of at least about 8, at least about 9, at least about 10, at least about 11, or at least about 12 and/or not more than about 17, not more than about 16, not more than about 15, or not more than about 14 weight percent.

When a polymer layer or interlayer includes more than one type of poly(vinyl acetal) resin, each of the poly(vinyl acetal) resins may have substantially the same residual hydroxyl contents, or one or more of the poly(vinyl acetal) resins may have a residual hydroxyl content substantially different from one or more other poly(vinyl acetal) resins. Various embodiments of several interlayers that include more than one poly(vinyl acetal) resin are discussed in further detail below.

One or more poly(vinyl acetal) resins used in interlayers according to the present invention may have a residual acetate content of not more than about 25, not more than about 20, not more than about 18, not more than about 15, not more than about 12, not more than about 10, not more than about 8, not more than about 6, not more than about 4, not more than about 3, or not more than about 2 weight percent. Alternatively, or in addition, at least one poly(vinyl acetal) resin used in a polymer layer or interlayer as described herein can have a residual acetate content of at least about 3, at least about 4, at least about 5, at least about 6, at least about 7, at least about 8, at least about 9, at least about 10, at least about 12, at least about 14 weight percent or more. When a polymer layer or interlayer includes two or more poly(vinyl acetal) resins, the resins may have substantially the same residual acetate content, or one or more resins may have a residual acetate content different from the residual acetate content of one or more other poly(vinyl acetal) resins.

The present invention discloses multiple layer panels comprising an acoustic polymer interlayer. In embodiments, the polymer interlayer can be either a monolithic acoustic interlayer or a multilayer acoustic interlayer or a combination of monolithic and multilayer interlayers. Monolithic or single layer polymer interlayers having acoustic or sound insulation properties can be produced by mixing a thermoplastic polymer resin and optionally a plasticizer, and extruding the mixture to form a polymer interlayer. The resultant acoustic polymer interlayer typically exhibits at least one glass transition temperature, $T_g$, of 25° C. or less. In embodiments, the thermoplastic resin is may be one of the thermoplastic polymers previously mentioned. In other embodiments, the thermoplastic resin is a poly(vinyl acetal) resin, such as poly(vinyl butyral) (PVB). Monolithic or single layer acoustic PVB interlayers can be produced by mixing PVB resin having a low residual hydroxyl content (weight percent PVOH), such as 17 weight percent or less, with higher amounts of a plasticizer, such as triethylene glycol di-(2-ethylhexanoate) (3GEH), and extruding the mixture to form a polymer interlayer. Alternatively, monolithic or single layer PVB interlayers having acoustic properties can be produced by mixing PVB resin having a high residual hydroxyl content, such as 18 weight percent or more, with a high amount of a plasticizer, or a mixture of plasticizers in which at least one plasticizer in the mixture is more efficient in plasticizing PVB resin than conventional plasticizer (such as 3GEH). Multiple layer interlayers (comprising at least two adjacent polymer layers in contact with each other) that exhibit acoustic properties and reduce sound transmission through a multiple layer glass panel can be produced in such a way that there are various compositional permutations or differences between the two or more layers as further described herein.

The polymeric resin or resins utilized in polymer layers and interlayers as described herein may comprise one or more thermoplastic polymer resins. In some embodiments, the thermoplastic resin or resins may be present in the polymer layer in an amount of at least about 50, at least about 55, at least about 60, at least about 65, at least about 70, at least about 75, at least about 80, at least about 85, at least about 90, or at least about 95 weight percent, based on the total weight of the polymer layer. When two or more resins are present, each may be present in an amount of at least about 0.5, at least about 1, at least about 2, at least about 5, at least about 10, at least about 15, at least about 20, at least about 25, at least about 30, at least about 35, at least about 40, at least about 45, or at least about 50 weight percent, based on the total weight of the polymer layer or interlayer.

One or more polymer layers as described herein may also include at least one plasticizer. When present, the plasticizer content of one or more polymer layers can be at least about 2, at least about 5, at least about 6, at least about 8, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 parts per hundred resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, not more than about 40, or not more than about 35 phr. In some embodiments, one or more polymer layers can have a plasticizer content of not more than 35, not more than about 32, not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr.

As used herein, the term "parts per hundred resin" or "phr" refers to the amount of plasticizer present per one hundred parts of resin, on a weight basis. For example, if 30 grams of plasticizer were added to 100 grams of a resin, the plasticizer content would be 30 phr. If the polymer layer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer, unless otherwise specified.

For layers of unknown plasticizer content, the plasticizer content can be determined via a wet chemical method in which an appropriate solvent, or mixture of solvents, is used to extract the plasticizer from the polymer layer or interlayer. Prior to extracting the plasticizer, the weight of the sample layer is measured and compared with the weight of the layer from which the plasticizer has been removed after extraction. Based on this difference, the weight of plasticizer can be determined and the plasticizer content, in phr, calculated. For multiple layer interlayers, the polymer layers can be physically separated from one another and individually analyzed according to the above procedure.

Although not wishing to be bound by theory, it is understood that, for a given type of plasticizer, the compatibility of the plasticizer in the poly(vinyl acetal) resin may be correlated to the residual hydroxyl content of the resin. More particularly, poly(vinyl acetal) resins having higher residual hydroxyl contents may generally have a reduced plasticizer compatibility or capacity, while poly(vinyl acetal) resins with a lower residual hydroxyl content may exhibit an increased plasticizer compatibility or capacity. Generally, this correlation between the residual hydroxyl content of a polymer and its plasticizer compatibility/capacity can be manipulated in order to facilitate addition of the proper amount of plasticizer to the polymer resin and to stably maintain differences in plasticizer content between multiple layers within an interlayer. A similar correlation may also exist for the compatibility of the plasticizer and residual acetate content in the poly(vinyl acetal) resin.

Any suitable plasticizer can be used in the polymer layers described herein. The plasticizer may have a hydrocarbon segment of at least about 6 and/or not more than about 30, not more than about 25, not more than about 20, not more than about 15, not more than about 12, or not more than about 10 carbon atoms. In various embodiments, the plasticizer is selected from conventional plasticizers, or a mixture of two or more conventional plasticizers. In some embodiments, the conventional plasticizer, which has refractive index of less than about 1.450, may include, triethylene glycol di-(2-ethylhexanoate) ("3GEH"), triethylene glycol di-(2-ethylbutyrate), tetraethylene glycol di-(2-ethylhexanoate) ("4GEH"), triethylene glycol diheptanoate, tetraethylene glycol diheptanoate, dihexyl adipate, dioctyl adipate, hexyl cyclohexyladipate, diisononyl adipate, heptylnonyl adipate, di(butoxyethyl) adipate, bis(2-(2-butoxyethoxy) ethyl) adipate, dibutyl sebacate, dioctyl sebacate, butyl ricinoleate, castor oil, triethyl glycol ester of coconut oil fatty acids, and oil modified sebacic alkyd resins. In some embodiments, the conventional plasticizer is 3GEH (Refractive index=1.442 at 25° C.).

In some embodiments, other plasticizers known to one skilled in the art may be used, such as a plasticizer with a higher refractive index (i.e., a high refractive index plasticizer). As used herein, a "high refractive index plasticizer" is a plasticizer having a refractive index of at least about 1.460. As used herein, the refractive index (also known as index of refraction) of a plasticizer or a resin used in the entirety of this disclosure is either measured in accordance with ASTM D542 at a wavelength of 589 nm and 25° C. or reported in literature in accordance with ASTM D542. In various embodiments, the refractive index of the plasticizer is at least about 1.460, or greater than about 1.470, or greater than about 1.480, or greater than about 1.490, or greater than about 1.500, or greater than 1.510, or greater than 1.520, for both core and skin layers. In some embodiments, the high refractive index plasticizer(s) is used in conjunction with a conventional plasticizer, and in some embodiments, if included, the conventional plasticizer is 3GEH, and the refractive index of the plasticizer mixture is at least 1.460. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, dibutoxy ethyl phthalate, diethyl phthalate, dibutyl phthalate, trioctyl phosphate, phenyl ethers of polyethylene oxide rosin derivatives, and tricresyl phosphate, and mixtures thereof. In some embodiments, the plasticizer may comprise, or consist of, a mixture of conventional and high refractive index plasticizers.

Additionally, at least one polymer layer may also include other types of additives that can impart particular properties or features to the polymer layer or interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers. Specific types and amounts of such additives may be selected based on the final properties or end use of a particular interlayer.

Additionally, various adhesion control agents ("ACAs") can also be used in one or more polymer layers in order to control the adhesion of the layer or interlayer to a sheet of glass. In various embodiments, the amount of ACAs present in a resin composition, layer, or interlayer can be at least about 0.003, at least about 0.01, at least about 0.025 and/or not more than about 0.15, not more than about 0.10, not more than about 0.04 phr. Suitable ACAs can include, but are not limited to, residual sodium acetate, potassium acetate, magnesium bis(2-ethyl butyrate), magnesium bis(2-ethylhexanoate), and combinations thereof, as well as the ACAs disclosed in U.S. Pat. No. 5,728,472.

Depending on the polymer type and layer composition, the polymer layers described herein may exhibit a wide range of glass transition temperatures. In some embodiments, interlayers including two or more polymers or polymer layers can exhibit two or more glass transition temperatures. The glass transition temperature ($T_g$) of a polymeric material is the temperature that marks the transition of the material from a glass state to a rubbery state. The glass transition temperatures of the polymer layers described herein were determined by dynamic mechanical thermal analysis (DMTA) according to the following procedure. A polymer sheet is molded into a sample disc of 25 millimeters (mm) in diameter. The polymer sample disc is placed between two 25-mm diameter parallel plate test fixtures of a Rheometrics Dynamic Spectrometer II. The polymer sample disc is tested in shear mode at an oscillation frequency of 1 Hertz as the temperature of the sample is increased from −20 to 70° C., or other temperature range, at a rate of 2° C./minute. The position of the maximum value of tan delta (damping) plotted as dependent on temperature is used to determine the glass transition temperature. Experience indicates that the method is reproducible to within +/−1° C.

Interlayers as described herein may include at least one polymer layer having a glass transition temperature of at least about −20, at least about −10, at least about −5, at least about −1, at least about 0, at least about 1, at least about 2, at least about 5, at least about 10, at least about 15, at least about 20, at least about 25, at least about 27, at least about 30, at least about 32, at least about 33, at least about 35, at least about 36, at least about 37, at least about 38, or at least about 40'C. Alternatively, or in addition, the polymer layer can have a glass transition temperature of not more than about 45, not more than about 44, not more than about 43, not more than about 42, not more than about 41, not more than about 40, not more than about 39, not more than about 38, not more than about 37, not more than about 36, not more than about 35, not more than about 34, not more than about 33, not more than about 32, not more than about 30, not more than about 25, not more than about 20, not more than about 15, not more than about 10, not more than about 5, not more than about 2, not more than about 0, not more than about −1, or not more than about −5° C.

In some embodiments, one or more polymer layers may have a glass transition temperature of at least about 30, at least about 32, at least about 33, at least about 35, at least about 36, at least about 37, at least about 38, at least about 39, or at least about 40° C. and/or not more than about 100, not more than about 90, not more than about 80, not more than about 70, not more than about 60, not more than about 50, not more than about 45, not more than about 44, not more than about 43, not more than about 42, not more than about 41, not more than about 40, not more than about 39, not more than about 38, or not more than about 37° C. Alternatively, or in addition, at least one polymer layer may have a glass transition temperature of at least about −10, at least about −5, at least about −2, at least about −1, at least about 0, at least about 1, at least about 2, or at least about 5 and/or not more than about 25, not more than about 20, not more than about 15, not more than about 10, not more than about 5, not more than about 2, not more than about 1, not more than about 0, or not more than about −1'C. When a polymer layer or interlayer includes two or more polymer layers, at least one of the layers may have a glass transition temperature different from one or more other polymer layers within the interlayer. Various embodiments of multiple layer interlayers will be discussed in further detail below.

According to some embodiments of the present invention, the interlayer may be a single layer, or monolithic, interlayer. In other embodiments, the interlayer may be a multiple layer interlayer comprising at least a first polymer layer and a second polymer layer. In some embodiments, the multiple layer interlayer may also include a third polymer layer and the second polymer layer is adjacent to and in contact with each of the first and third polymer layers such that the second polymer layer is sandwiched between the first and third polymer layers. As used herein, the terms "first," "second," "third," and the like are used to describe various elements, but such elements should not be unnecessarily limited by these terms. These terms are only used to distinguish one element from another and do not necessarily imply a specific order or even a specific element. For example, an element may be regarded as a "first" element in the description and a "second" element in the claims without being inconsistent. Consistency is maintained within the description and for each independent claim, but such nomenclature is not necessarily intended to be consistent therebetween. Such three-layer interlayers may be described as having at least one inner "core" layer sandwiched between two outer "skin" layers.

In some embodiments, each of the polymer layers in an interlayer can include a poly(vinyl acetal) resin. When the interlayer is a multiple layer interlayer, it may include a first polymer layer comprising a first poly(vinyl acetal) resin and a second polymer layer comprising a second poly(vinyl acetal) resin. The first and second polymer layers can be adjacent to one another or, optionally, may have one or more intervening polymer layers therebetween.

When present, the first and second poly(vinyl acetal) resins of the respective first and second polymer layers can have different compositions. For example, in some embodiments, the first poly(vinyl acetal) resin can have a residual hydroxyl content that is at least about 2, at least about 3, at least about 4, at least about 6, at least about 7, at least about 8, at least about 9, at least about 10, at least about 11, at least about 12, at least about 13, at least about 14, at least about 15, at least about 16, at least about 17, at least about 18, at least about 19, at least about 20, at least about 21, at least about 22, at least about 23, or at least about 24 weight percent different than the residual hydroxyl content of the second poly(vinyl acetal) resin.

Additionally, or in the alternative, the first poly(vinyl acetal) resin can have a residual acetate content that is at least about 2, at least about 3, at least about 4, at least about 5, at least about 6, at least about 7, at least about 8, at least about 9, at least about 10, at least about 11, at least about 12, at least about 13, at least about 15, at least about 18, or at least about 20 weight percent different than the residual acetate content of the second poly(vinyl acetal) resin. In other embodiments, the first poly(vinyl acetal) resin can have a residual acetate content that is not more than about 2, not more than about 1.5, not more than about 1, or not more than about 0.5 weight percent different than the residual acetate content of the second poly(vinyl acetal) resin.

As used herein, the term "weight percent different" or "the difference . . . is at least . . . weight percent" refers to a difference between two given percentages, calculated by finding the absolute value of the mathematical difference between the two numbers. A value that is "different" from a given value can be higher or lower than the given value. For example, a first poly(vinyl acetal) resin having a residual hydroxyl content that is "at least 2 weight percent different than" the residual hydroxyl content of a second poly(vinyl acetal) resin may have a residual hydroxyl content that is at least 2 weight percent higher or at least 2 weight percent lower than the second residual hydroxyl content. For example, if the residual hydroxyl content of the exemplary second poly(vinyl acetal) resin is 14 weight percent, the residual hydroxyl content of the exemplary first poly(vinyl acetal) resin can be at least 16 weight percent (e.g., at least 2 weight percent higher) or not more than 12 weight percent (e.g., at least 2 weight percent lower).

As a result of having different compositions, the portions of the layer or interlayer formed from the first poly(vinyl acetal) resin and the second poly(vinyl acetal) resin may have different properties, due to, for example, differences in plasticizer content. As described previously, when two poly(vinyl acetal) resins having different residual hydroxyl contents are blended with a plasticizer(s), the plasticizer will partition between the different resins, such that a higher amount of plasticizer is present in the layer formed from the lower residual hydroxyl content resin and less plasticizer is present in the portion of the layer including the higher residual hydroxyl content resin. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more layers when the plasticizer would otherwise migrate from one to the other.

When the first and second poly(vinyl acetal) resins have different residual hydroxyl contents or have different residual acetate contents, the first and second polymer layers may also include different amounts of plasticizer. As a result, each of these portions may also exhibit different properties, such as, for example, glass transition temperature. In some embodiments, the difference in plasticizer content between adjacent first and second polymer layers can be at least about 2, at least about 5, at least about 8, at least about 10, at least about 12, or at least about 15 phr, measured as described above. In other embodiments, the difference in plasticizer content between adjacent first and second polymer layers can be at least about 18, at least about 20, at least about 25, at least about 30, at least about 35, at least about 40, at least about 45, at least about 50, at least about 55, at least about 60, or at least about 65 phr.

In addition, or in the alternative, the difference between the plasticizer content of adjacent first and second polymer layers may be not more than about 40, not more than about 35, not more than about 30, not more than about 25, not more than about 20, not more than about 17, not more than about 15 or not more than about 12 phr. The values for the plasticizer content of each of the first and second polymer layers may fall within one or more of the ranges provided above.

In some embodiments, the glass transition temperature of the first polymer layer can be at least about 3, at least about 5, at least about 8, at least about 10, at least about 12, at least about 13, at least about 15, at least about 18, at least about 20, at least about 22, at least about 25, at least about 30, at least about 35, or at least about 40° C. different than the second polymer layer. The values for the glass transition temperatures of each of the first and second polymer layers may fall within one or more of the ranges provided above.

When the multiple layer interlayer includes three polymer layers, each of the respective first, second, and third polymer layers can include at least one poly(vinyl acetal) resin and an optional plasticizer of the types and in the amounts described in detail previously. According to some embodiments, the second, inner polymer layer can include a resin having a residual hydroxyl content lower than the residual hydroxyl contents of the poly(vinyl acetal) resins in each of the first and third polymer layers. Consequently, as the plasticizer partitions between the layers, the second inner layer may have a glass transition temperature lower than the glass transition temperatures of each of the first and third outer polymer layers. Although not wishing to be bound by theory, it is understood that this type of configuration, wherein relatively "stiff" (i.e., higher glass transition temperature) outer polymer layers are sandwiching a "soft" (i.e., relatively low glass transition temperature) inner layer, may facilitate enhanced acoustic performance from the interlayer.

In some embodiments, the first and third outer polymer layers can have the same as or similar compositions and/or properties. For example, in some embodiments, the poly(vinyl acetal) resin in the first polymer layer can have a residual hydroxyl content within about 2, within about 1, or within about 0.5 weight percent of the residual hydroxyl content of the poly(vinyl acetal) resin in the third polymer layer. Similarly, the poly(vinyl acetal) resins in the first and third layer can have residual acetate contents within about 2, within about 1, or within about 0.5 weight percent of one another. Additionally, the first and third outer polymer layers may have similar plasticizer contents and/or may exhibit similar glass transition temperatures. For example, the plasticizer content of the first polymer layer can be less than 2, not more than about 1, or not more than about 0.5 phr different than the plasticizer content of the third polymer layer, and/or the first and third polymer layers can have glass transition temperatures that differ by less than 2, not more than about 1, or not more than about 0.5° C.

The interlayers of the present invention can be formed according to any suitable method. Exemplary methods can include, but are not limited to, solution casting, compression molding, injection molding, melt extrusion, melt blowing, and combinations thereof. Multilayer interlayers including two or more polymer layers may also be produced according to any suitable method such as, for example, co-extrusion, blown film, melt blowing, dip coating, solution coating, blade, paddle, air-knife, printing, powder coating, spray coating, lamination, and combinations thereof.

According to various embodiments of the present invention, the layers or interlayers may be formed by extrusion or co-extrusion. In an extrusion process, one or more thermoplastic resins, plasticizers, and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

The overall average thickness of interlayers according to various embodiments of the present invention can be at least about 10, at least about 15, at least about 20, at least about 25, at least about 30, or at least about 35 mils (1 mil =0.0254 mm) and/or not more than about 120, not more than about 90, not more than about 75, not more than about 60, not more than about 50, not more than about 45, not more than about 40, not more than about 35, or not more than about 32 mils. If the interlayer is not laminated between two substrates, its average thickness can be determined by directly measuring the thickness of the interlayer using a caliper, or other equivalent device. If the interlayer is laminated between two substrates, its thickness can be determined by subtracting the combined thickness of the substrates from the total thickness of the multiple layer panel.

In some embodiments, one or more polymer layers can have an average thickness of at least about 1, at least about 2, at least about 3, at least about 4, at least about 5, at least about 6, at least about 7, at least about 8, at least about 9, or at least about 10 mils or more. Additionally, or in the alternative, one or more of the polymer layers in an interlayer as described herein can have an average thickness of not more than about 25, not more than about 20, not more than about 15, not more than about 12, not more than about 10, not more than about 8, not more than about 6, or not more than about 5 mils.

In some embodiments, the polymer layers or interlayers can comprise flat polymer layers having substantially the same thickness along the length, or longest dimension, and/or width, or second longest dimension, of the sheet. In other embodiments, one or more layers of an interlayer can be wedge-shaped or can have a wedge-shaped profile, such that the thickness of the interlayer changes along the length and/or width of the sheet and one edge of the layer or interlayer has a thickness greater than the other edge. When the interlayer is a multilayer interlayer, at least one, at least two, or at least three (or more) of the layers of the interlayer can be wedge-shaped. When the interlayer is a monolithic interlayer, the polymer sheet can be flat or wedge shaped. Wedge-shaped interlayers may be useful in, for example, head-up display (HUD) panels in automotive and aircraft applications.

Turning now to FIGS. 1 through 8b, several embodiments of wedge-shaped or tapered interlayers according to the present invention are provided. FIG. 1 is a cross-sectional view of an exemplary tapered interlayer that includes a tapered zone of varying thickness. As shown in FIG. 1, the tapered interlayer includes opposite first and second outer terminal edges. In the embodiment depicted in FIG. 1, the first and second boundaries of the tapered zone are spaced inwardly from the first and second outer terminal edges of the interlayer. In such embodiments, only a portion of the interlayer is tapered. In an alternative embodiment, discussed below, the entire interlayer is tapered. When the entire interlayer is tapered, the tapered zone width is equal to the interlayer width and the first and second boundaries of the tapered zone are located at the first and second terminal edges, respectively.

As illustrated in FIG. 1, the tapered zone of the interlayer has a wedge angle ($\Theta$), which is defined as the angle formed between a first reference line extending through two points of the interlayer where the first and second tapered zone boundaries intersect a first (upper) surface of the interlayer and a second reference line extending through two points where the first and second tapered zone boundaries intersect a second (lower) surface of the interlayer. When the first and second surfaces of the tapered zone are each planar, the wedge angle of the tapered zone is simply the angle between the first (upper) and second (lower) surfaces. However, as discussed in further detail below, in certain embodiments, the tapered zone can include at least one variable angle zone having a curved thickness profile and a continuously varying wedge angle. Further, in certain embodiments, the tapered zone can include two or more constant angle zones, where the constant angle zones each have a linear thickness profile, but at least two of the constant angle zones have different wedge angles.

Figure 2:
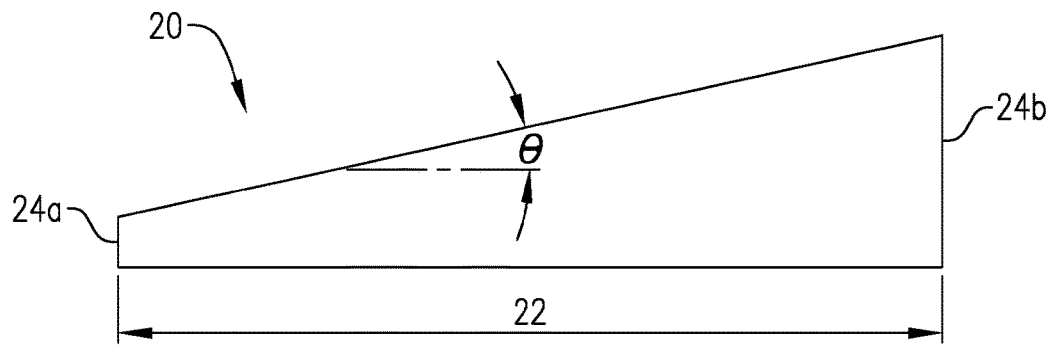
FIG. 2 is a cross-sectional view of a tapered interlayer having a tapered zone that extends over the entire width of the interlayer, where the entire tapered zone has a constant wedge angle and a linear thickness profile.
Figure 3:
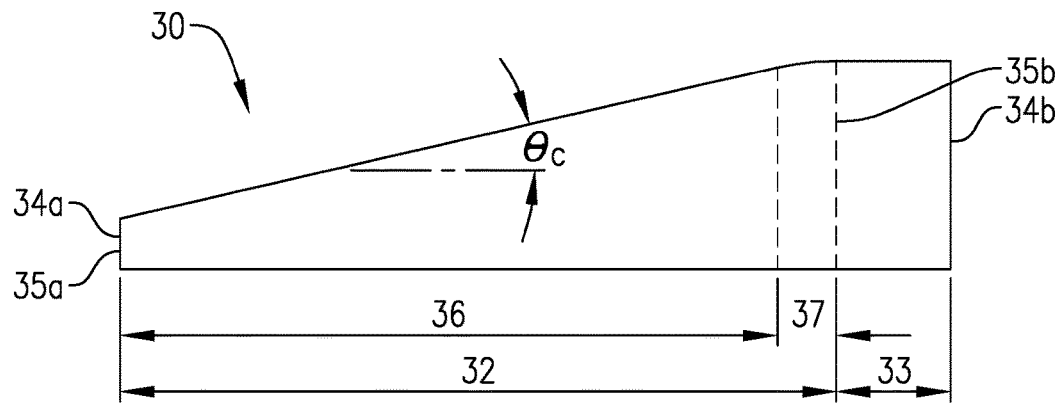
FIG. 3 is a cross-sectional view of a tapered interlayer having a tapered zone that extends over part of the width of the interlayer and a flat edge zone that extends over part of the width of the interlayer, where the tapered zone includes a constant angle zone and a variable angle zone.
Figure 4:
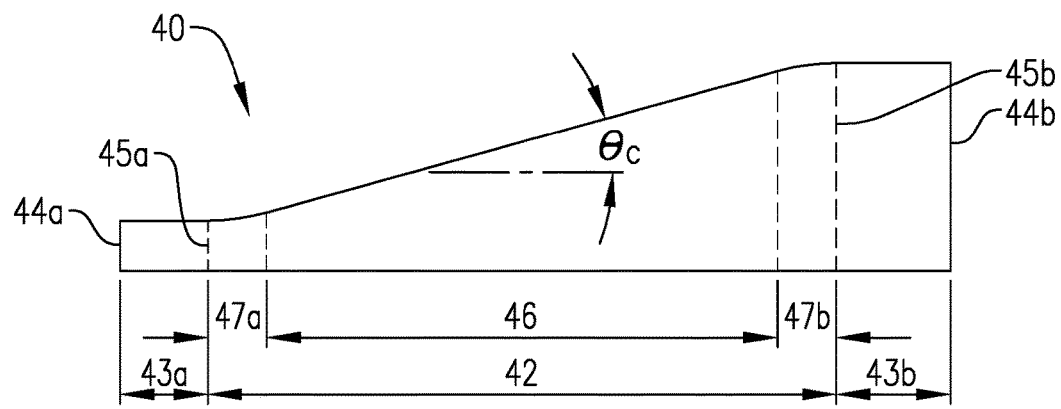
FIG. 4 is a cross-sectional view of a tapered interlayer having a tapered zone that extends over part of the width of the interlayer and two flat edge zones that extend over part of the width of the interlayer, where the tapered zone includes a constant angle zone and two variable angle zones.
Figure 5:
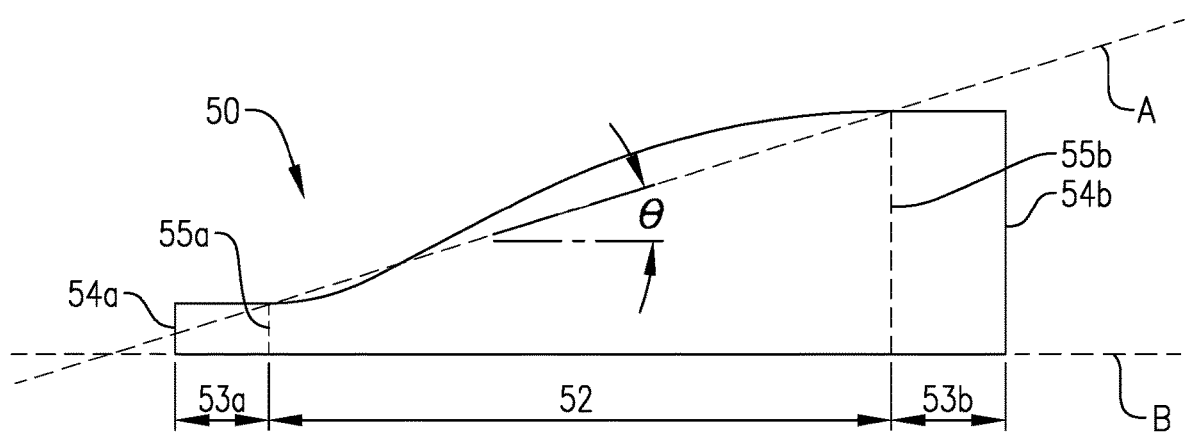
FIG. 5 is a cross-sectional view of a tapered interlayer having a tapered zone that extends over part of the width of the interlayer and two flat edge zones that extend over part of the width of the interlayer, where the tapered zone is formed entirely of a variable angle zones having a curved thickness profile.
Figure 6:
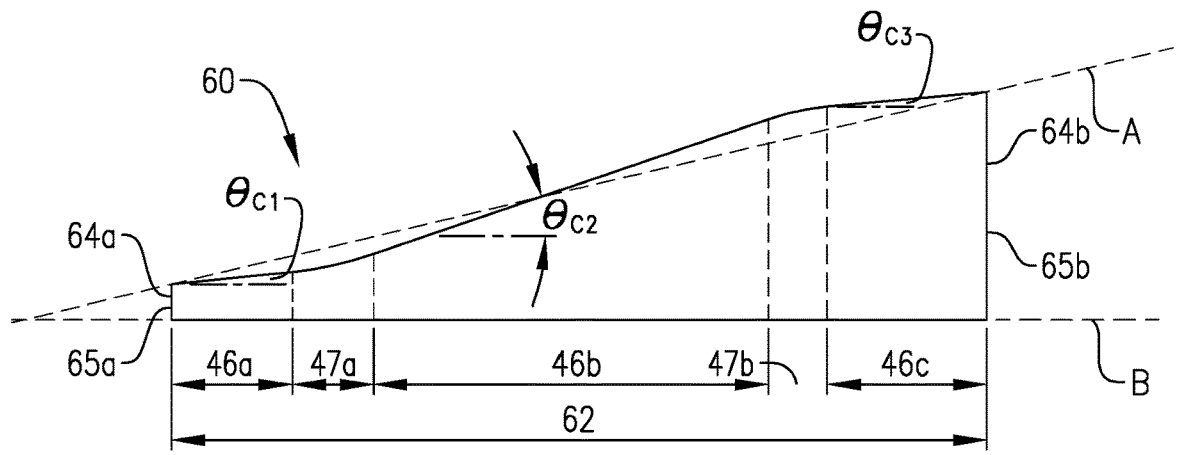
FIG. 6 is a cross-sectional view of a tapered interlayer having a tapered zone that extends over the entire width of the interlayer, where the tapered includes three constant angle zones spaced from one another by two variable angle zones.
Figure 7:
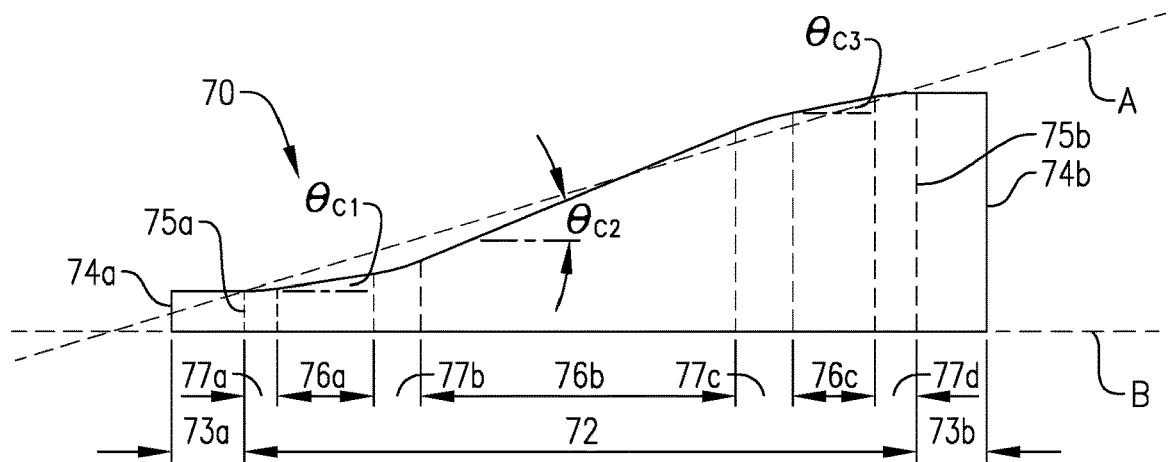
FIG. 7 is a cross-sectional view of a tapered interlayer having a tapered zone that extends over part of the width of the interlayer and two flat edge zones that extend over part of the width of the interlayer, where the tapered zone includes three constant angle zone and four variable angle zones.
Figures 8A, 8B:
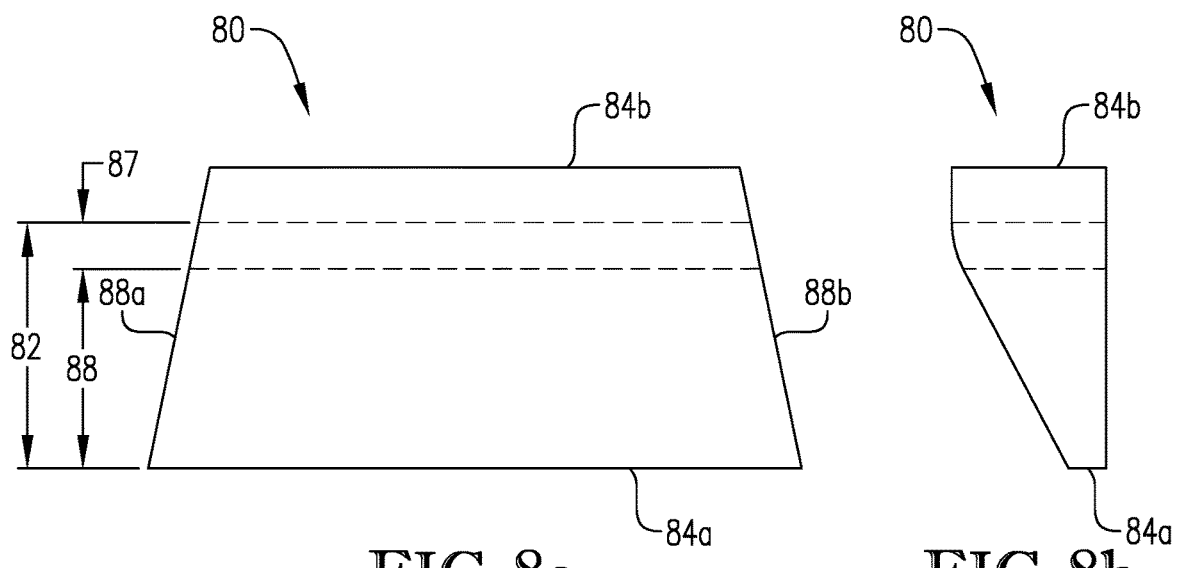
FIG. 8a is a plan view of a tapered interlayer configured for use in a vehicle windshield, where the thickness provide of the interlayer is similar to the thickness profile of the interlayer depicted in FIG. 2.
FIG. 8b is a cross-sectional view of the interlayer of FIG. 8a, showing the thickness profile of the interlayer.

FIGS. 2-7 illustrate various tapered interlayers configured according embodiments of the present invention. FIG. 2 depicts an interlayer 20 that includes a tapered zone 22 extending entirely from a first terminal edge 24a of the interlayer 20 to a second terminal edge 24b of the interlayer 20. FIG. 3 illustrates an interlayer 30 that includes a tapered zone 32 and a flat edge zone 33. The interlayer 30 depicted in FIG. 3 has a constant wedge angle $\Theta_c$ that is greater than the overall wedge angle of the entire tapered zone 32. FIG. 4 illustrates an interlayer 40 that includes a tapered zone 42 located between first and second flat edge zones 43a,b. The interlayer 40 depicted in FIG. 4 has a constant wedge angle $\Theta_c$ that is greater than the overall wedge angle of the entire tapered zone 42. FIG. 5 illustrates an interlayer 50 that includes a tapered zone 52 located between first and second flat edge zones 53a,b. FIG. 6 illustrates an interlayer 60 that does not include any flat end portions. Rather, the tapered zone 62 of the interlayer 60 forms the entire interlayer 60. FIG. 7 illustrates an interlayer 70 that includes a tapered zone 72 located between first and second flat edge zones 73a,b.

As discussed above, the tapered interlayer can include one or more constant angle tapered zones, each having a width that is less than the overall width of the entire tapered zone. Each tapered zone can have a wedge angle that is the same as or different than the overall wedge angle of the entire tapered zone. For example, the tapered zone can include one, two, three, four, five or more constant angle tapered zones. When multiple constant angle tapered zones are employed, the constant angle tapered zones can be separated from one another by variable angle tapered zones that serve to transition between adjacent constant angle tapered zones.

In some embodiments, in addition to the interlayer(s), the multiple layer panels may also include an interlayer(s) and, at least one polymer film, where the polymer film(s) may be between two layers of interlayer, such as encapsulated between two layers of interlayer. The use of a polymer film in multiple layer panels as described herein may enhance the optical character or properties of the final panel, while also providing other performance improvements, such as infrared absorption. Polymer films differ from polymer layers or interlayers in that the films alone do not provide the necessary penetration resistance and glass retention properties. The polymer film is also generally thinner than the sheet, and may generally have a thickness in the range of from 0.001 to 0.25 mm. Poly(ethylene terephthalate) ("PET") is one example of a material used to form the polymer film. Examples of suitable constructs where a polymer film may be used include (glass)//(interlayer)//(film)//(interlayer)//(glass) and (glass)//(interlayer)//(film)//(multiple layer interlayer)//(glass), where the polymer film may have coatings or any other functional layer(s), as previously described.

According to some embodiments, multiple layer panels of the present invention may exhibit desirable acoustic properties, as indicated by, for example, the reduction in the transmission of sound as it passes through (i.e., the sound transmission loss of) the interlayer. In some embodiments, multiple layer panels of the present invention may exhibit a sound transmission loss at the coincident frequency, measured according to ASTM E90 at 20° C. and having panel dimensions of 50 cm by 80 cm, of at least about 34, at least about 34.5, at least about 35, at least about 35.5, at least about 36, at least about 36.5, at least about 37, at least about 37.5, at least about 38, at least about 38.5, at least about 39, at least about 39.5, at least about 40, or at least about 41. Such acoustic properties may be achieved even when, for example, the combined thickness of the glass is less than 3.7 mm or thinner, as described in detail previously.

In some embodiments, asymmetric multiple layer panels as described herein may exhibit a sound transmission loss at the coincident frequency that is at least 2, at least about 2.5, at least about 3, at least about 3.5, at least about 4, at least about 4.5, or at least about 5 dB greater than the sound transmission loss at the coincident frequency of a comparative symmetric panel. As used herein, the term "comparative symmetric panel," refers to a multiple layer panel formed from two sheets of clear glass and a single layer conventional interlayer disposed therebetween. The conventional interlayer is formed from poly(vinyl butyral) having a residual hydroxyl content of 18.5 weight percent and a residual acetate content of less than 2 weight percent and includes 38 phr of 3GEH plasticizer. The two sheets of glass have the same combined thickness as a given asymmetric panel, but are of equal thickness, such that the symmetry of the two glass sheets in the comparative panel is 1.0.

Additionally, or in the alternative, multiple layer panels of the present invention can have a suitable strength. For example, in some embodiments, multiple layer panels of the present invention can have a deflection stiffness of at least about 15, at least about 20, at least about 25, at least about 30, at least about 35, at least about 40, at least about 45, at least about 50, at least about 55, at least about 60, at least about 70, or at least about 80 N/mm, measured as described below in Example 2 below.

Multiple layer panels of the present invention may have excellent optical properties, such as low haze and good clarity. Multiple layer panels of the present invention may also have high visual transmittance (% $T_{vis}$) depending on the desired end use.

Multiple layer panels as described herein may be formed by any suitable method. The typical glass lamination process comprises the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to one embodiment in steps (2) through (5) above include vacuum bag and vacuum ring processes, and both may also be used to form interlayers of the present invention as described herein.

The multiple layer panels of the present invention can be used for a variety of end use applications, including, for example, for automotive windshields and windows, aircraft windshields and windows, panels for various transportation applications such as marine applications, rail applications, etc., structural architectural panels such as windows, doors, stairs, walkways, balustrades, decorative architectural panels, weather-resistant panels, such as hurricane glass or tornado glass, ballistic panels, and other similar applications.

The following examples are intended to be illustrative of the present invention in order to teach one of ordinary skill in the art to make and use various embodiments of the invention and are not intended to limit the scope of the invention in any way.

EXAMPLES

Example 1

Several polymer sheets were formed by melt blending a poly(vinyl butyral) resin having a residual hydroxyl content of 18.5 weight percent and a residual acetate content of less than 2 weight percent ("Resin B") with 38 parts per hundred resin (phr) of triethylene glycol di-(2-ethylhexanoate) ("3GEH") plasticizer. The resulting plasticized resin was extruded to form a polymer sheet having a thickness of 0.76 mm, which was then cut into several single-layer interlayer sheets each having a glass transition temperature of 30° C. Interlayers having this construction are referred to as interlayer "PVB-1" or a "conventional monolithic interlayer" herein.

Several three-layer (or tri-layer) interlayers were also formed by coextruding Resin B with another poly(vinyl butyral) resin having a residual hydroxyl content of 10.5 weight percent and a residual acetate content of less than 2 weight percent ("Resin A") that had been melt blended with 75 phr of 3GEH. The resulting multiple layer interlayers included two outer layers formed from plasticized Resin B sandwiching an inner layer formed from plasticized Resin A, and they are referred to as interlayer "PVB-2" herein.

Several multiple layer panels were then formed using PVB-1 and PVB-2, the single- and multiple-layer interlayers described above. Each panel was formed by laminating an interlayer between a pair of 500 mm by 800 mm sheets of glass having varying thicknesses. The lamination was performed by assembling the two glass substrates and interlayer with the interlayer between the glass substrates; (2) heating the assembly to about 40° C.; (3) passing the assembly into a pressure nip roll for the first deairing; (4) heating the assembly a second time to about 100° C. to give the assembly enough temporary adhesion to seal the edge of the interlayer; (5) passing the assembly into a second pressure nip roll to further seal the edge of the interlayer and allow further handling; and (6) autoclaving the assembly at a temperature of about 143° C. and pressure of about 190 psig for about 30 minutes. The configurations of each of the panels are summarized in Table 1, below.

TABLE 1

Configurations of Panels

| Glass Panel | Interlayer | Glass Configuration (mm/mm) | Combined Glass Thickness (mm) | Symmetry |
|---|---|---|---|---|
| LG-1 | PVB-1 | 1.85/1.85 | 3.7 | 1 |
| LG-2 | PVB-1 | 2.1/1.6 | 3.7 | 0.76 |
| LG-3 | PVB-1 | 3.0/0.7 | 3.7 | 0.23 |
| LG-4 | PVB-1 | 1.6/1.6 | 3.2 | 1 |
| LG-5 | PVB-1 | 1.9/1.25 | 3.2 | 0.66 |
| LG-6 | PVB-2 | 1.85/1.85 | 3.7 | 1 |
| LG-7 | PVB-2 | 2.1/1.6 | 3.7 | 0.76 |
| LG-8 | PVB-2 | 3.0/0.7 | 3.7 | 0.23 |
| LG-9 | PVB-2 | 1.6/1.6 | 3.2 | 1 |
| LG-10 | PVB-2 | 1.9/1.25 | 3.2 | 0.66 |

The sound transmission loss of each of the panels LG-1 through LG-10 was determined according to the procedure described by ASTM E90 at 20° C., for various frequencies over a range of 200 Hz to 8,000 Hz. The results are summarized in Table 2, below.

TABLE 2

Sound Transmission Loss of Glass Panels

| | Sound Transmission Loss (dB) Panels with PVB-1 Interlayer | | | | | Sound Transmission Loss (dB) Panels with PVB-2 Interlayer | | | | |
|---|---|---|---|---|---|---|---|---|---|---|
| Frequency (Hz) | LG-1 1.85/1.85 | LG-2 2.1/1.6 | LG-3 3.0/0.7 | LG-4 1.6/1.6 | LG-5 1.9/1.25 | LG-6 1.85/1.85 | LG-7 2.1/1.6 | LG-8 3.0/0.7 | LG-9 1.6/1.6 | LG-10 1.9/1.25 |
| 200 | 20.9 | 21.5 | 19.3 | 18.6 | 20.0 | 20.1 | 20.7 | 20.3 | 20.2 | 20.6 |
| 250 | 23.3 | 23.1 | 23.3 | 21.3 | 20.8 | 24.8 | 24.8 | 24.8 | 22.0 | 21.1 |
| 315 | 26.5 | 26.4 | 26.3 | 24.1 | 23.2 | 25.8 | 25.6 | 25.9 | 23.4 | 22.9 |
| 400 | 28.0 | 28.0 | 28.1 | 26.9 | 26.0 | 28.6 | 28.9 | 28.1 | 26.4 | 25.4 |
| 500 | 28.8 | 29.0 | 28.6 | 27.3 | 27.1 | 30.5 | 30.3 | 30.3 | 28.3 | 27.5 |
| 630 | 31.2 | 31.0 | 30.4 | 30.5 | 30.2 | 31.6 | 31.7 | 31.3 | 30.9 | 30.7 |
| 800 | 32.4 | 32.4 | 31.9 | 31.3 | 31.1 | 33.4 | 33.3 | 33.0 | 32.1 | 32.2 |
| 1000 | 33.3 | 33.5 | 33.3 | 33.2 | 33.1 | 34.7 | 34.5 | 34.1 | 33.8 | 33.7 |
| 1250 | 35.0 | 35.1 | 35.0 | 34.4 | 34.3 | 36.7 | 36.4 | 35.8 | 35.2 | 35.1 |
| 1600 | 35.8 | 35.7 | 35.7 | 35.3 | 35.2 | 37.5 | 37.5 | 37.2 | 36.7 | 36.5 |
| 2000 | 35.3 | 35.2 | 35.1 | 35.8 | 35.7 | 38.4 | 38.3 | 37.7 | 37.7 | 37.6 |
| 2500 | 34.3 | 34.3 | 33.9 | 35.2 | 35.0 | 39.8 | 39.6 | 38.6 | 38.5 | 38.3 |
| 3150 | 32.0 | 31.8 | 30.6 | 33.0 | 32.5 | 40.3 | 40.1 | 37.7 | 39.5 | 39.2 |
| 4000 | 31.8 | 31.7 | 31.1 | 30.3 | 30.1 | 39.7 | 39.5 | 34.5 | 39.7 | 39.2 |
| 5000 | 36.2 | 36.2 | 36.4 | 32.6 | 32.1 | 38.4 | 38.1 | 34.1 | 39.4 | 38.5 |
| 6300 | 41.2 | 41.4 | 41.3 | 37.4 | 37.3 | 38.4 | 38.1 | 40.6 | 38.9 | 37.1 |
| 8000 | 43.5 | 43.7 | 44.3 | 40.0 | 40.1 | 42.4 | 42.6 | 43.7 | 39.4 | 38.6 |

Tables 3a and 3b, below, respectively summarize the sound transmission loss at the coincident frequency for each of panels LG-1 through LG-5, which were formed with the conventional monolithic interlayers (PVB-1), and each of Panels LG-6 thorough LG-10, which were formed with multilayer (trilayer) interlayers (PVB-2). Tables 3a and 3b also summarize the difference between the sound transmission loss at the coincident frequency for each of panels LG-2 through LG-5 and LG-7 through LG-10, and the sound transmission loss at the coincident frequency for a symmetrically configured panel utilizing a similar monolithic or tri-layer interlayer and having a combined glass thickness of 3.7 mm (e.g., LG-1 and LG-6, respectively).

TABLE 3a

Sound Transmission Loss at the Coincident Frequency-Monolithic Interlayers

| Glass Panel | Interlayer | Glass Configuration (mm/mm) | Combined Glass Thickness (mm) | Symmetry | Coincident Frequency (Hz) | Transmission Loss at Coincident Frequency (dB) | Decrease in TL from LG-1 (dB) |
|---|---|---|---|---|---|---|---|
| LG-1 | PVB-1 | 1.85/1.85 | 3.7 | 1 | 4000 | 31.9 | — |
| LG-2 | PVB-1 | 2.1/1.6 | 3.7 | 0.76 | 4000 | 31.8 | −0.1 |
| LG-3 | PVB-1 | 3.0/0.7 | 3.7 | 0.23 | 3150 | 30.6 | −1.3 |
| LG-4 | PVB-1 | 1.6/1.6 | 3.2 | 1 | 4000 | 30.3 | −1.6 |
| LG-5 | PVB-1 | 1.9/1.25 | 3.2 | 0.66 | 4000 | 30.1 | −1.8 |

TABLE 3b

Sound Transmission Loss at the Coincident Frequency-Trilayer Interlayers

| Glass Panel | Interlayer | Glass Configuration (mm/mm) | Combined Glass Thickness (mm) | Symmetry | Coincident Frequency (Hz) | Transmission Loss at Coincident Frequency (dB) | Decrease in TL from LG-6 (dB) |
|---|---|---|---|---|---|---|---|
| LG-6 | PVB-2 | 1.85/1.85 | 3.7 | 1 | 5000-6300 | 38.4 | — |
| LG-7 | PVB-2 | 2.1/1.6 | 3.7 | 0.76 | 5000-6300 | 38.1 | −0.3 |
| LG-8 | PVB-2 | 3.0/0.7 | 3.7 | 0.23 | 5000 | 34.1 | −4.3 |
| LG-9 | PVB-2 | 1.6/1.6 | 3.2 | 1 | 6300 | 38.9 | 0.5 |
| LG-10 | PVB-2 | 1.9/1.25 | 3.2 | 0.66 | 6300 | 37.1 | −1.3 |

As shown in Tables 2 and 3a, above, none of the panels including PVB-1, a conventional monolithic interlayer (LG-1 through LG-5) achieve a sound transmission loss (STL) greater than 32 dB at the coincident frequency region. Panel LG-1, which has a symmetric configuration and a combined glass thickness of 3.7 mm, exhibits the best performance at the coincident frequency. However, as shown by comparing the results for panels LG-1 through LG-3 in Tables 2 and 3a, above, varying the thicknesses of the individual glass sheets in panels formed from PVB-1 while maintaining the combined glass thickness of 3.7 mm results in relatively minor differences in changes in the sound transmission loss. Similar trends can be observed at lower combined thicknesses as well, as shown by, for example, panels LG-4 and LG-5, which each have a combined glass thickness of 3.2 mm with symmetries of 1 and 0.66 respectively.

Figure 9:
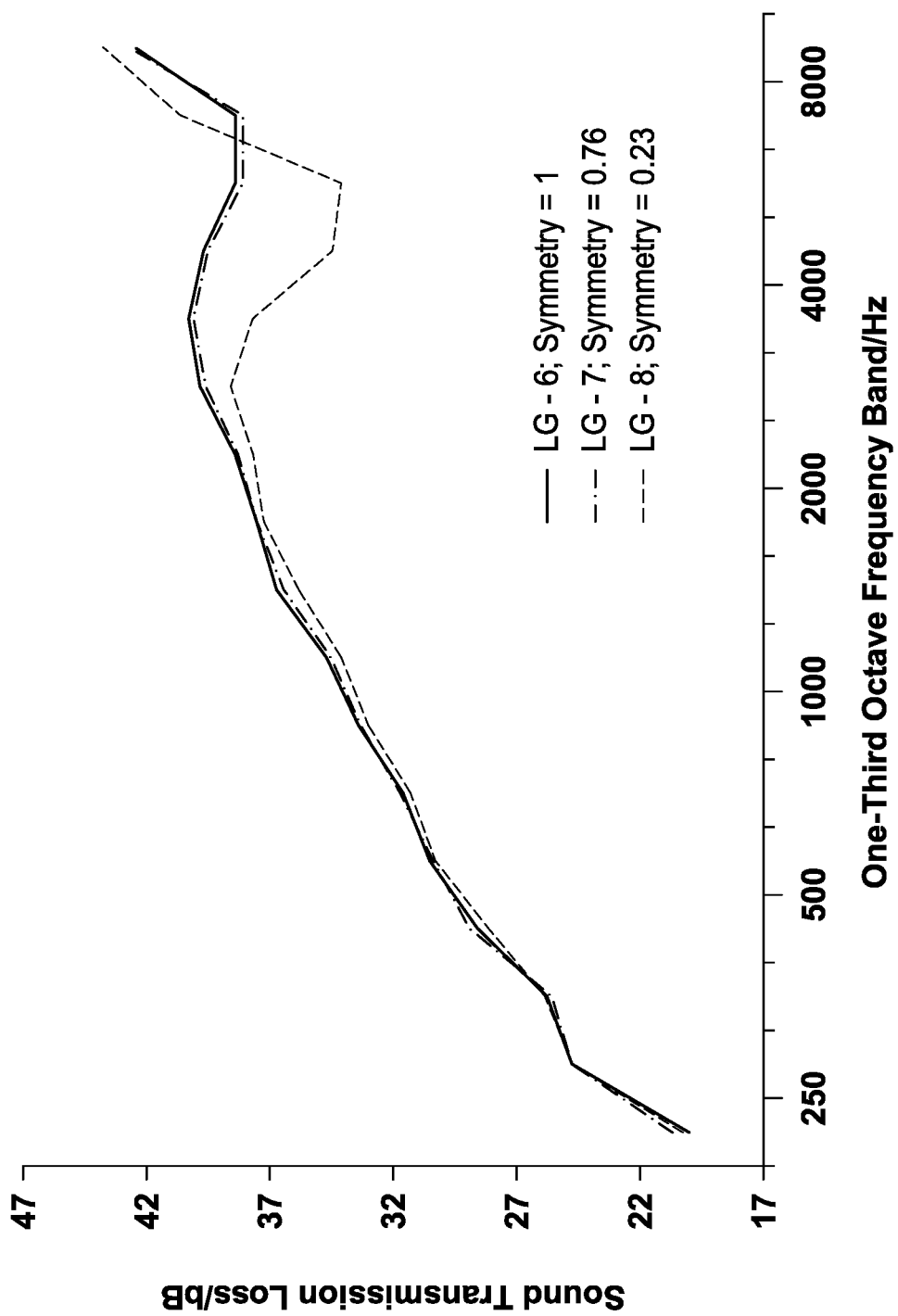
FIG. 9 is a graph of the sound transmission loss of several multiple layer panels formed and tested as described in Example 1.

In contrast, as shown in Tables 2 and 3b, varying the thickness of the individual glass sheets in panels formed from tri-layer interlayers (PVB-2) while maintaining the same combined glass thickness results in a more pronounced change in sound transmission loss at the coincident frequency. For example, as shown by a comparison of panel LG-6 with panels LG-7 and LG-8, a graphical representation of which is provided in FIG. 9, less symmetric glass configurations (i.e., symmetry of less than 1) result in lower sound transmission loss at the coincident frequency. As shown in Table 3b and in FIG. 9, the minimum symmetry at which the panels formed from a tri-layer interlayer exhibit a sound transmission loss at the coincident frequency of at least 34 dB is 0.23. It is expected that the sound transmission loss at the coincident frequency for similar panels having symmetries less than 0.23 will be less than 34 dB, which is generally not suitable for use in applications requiring acoustic performance.

Example 2

Two monolithic interlayers, PVB-1 and PVB-4, were used to construct multiple layer panels. Interlayer PVB-1 was formed by melt blending 38 phr of 3GEH plasticizer with a poly(vinyl butyral) resin having a residual hydroxyl content of 18.5 weight percent, a residual acetate content of less than 2 weight percent, and a glass transition temperature of 30° C., as described in Example 1, as a flat polymer sheet having an average thickness of 30 mils. Another conventional monolithic interlayer ("PVB-4") was also formed by melt blending the same poly(vinyl butyral) resin with 38 phr of 3GEH plasticizer and extruding the resulting plasticized resin to form a wedge shaped interlayer having a wedge angle of 0.43 mrad and a glass transition temperature of 30° C.

Two multiple layer interlayers, PVB-2 and PVB-3, were also formed by co-extruding two different poly(vinyl butyral) resins into a tri-layer formation that included two stiff outer layers having similar compositions, which were adjacent to and in contact with a softer inner layer of a different composition. Interlayer PVB-2 was prepared and configured as described in Example 1, above, and interlayer PVB-3 was configured in a similar manner except that the outer layers were formed from a poly(vinyl butyral) resin having a residual hydroxyl content of 22 weight percent and a residual acetate content of less than 2 weight percent ("Resin D") and 27 phr of 3GEH plasticizer, and the inner layer was formed from a poly(vinyl butyral) resin having a residual hydroxyl content of 9 weight percent and a residual acetate content of less than 2 weight percent ("Resin C") plasticized with 70 phr of 3GEH. The outer layers of interlayer PVB-2 had a glass transition temperature of 30° C., while the outer layers of the interlayer PVB-3 had a glass transition temperature of 42° C. The glass transition temperature of the inner layers of interlayers PVB-2 and PVB-3 was −2° C. Both PVB-2 and PVB-3 had average thicknesses of 33 mils, with an average inner layer thickness of 4.5 mils.

Another tri-layer interlayer, PVB-5, was prepared and configured in the same manner as PVB-2 except that PVB-5 was a wedge shaped interlayer having a wedge angle of 0.43 mrad. Interlayer PVB-5 had an inner layer thickness of 4.5 mils and interlayer thickness of 31 mils at the thinner end. Interlayer PVB-6 was a wedge shaped interlayer having a wedge angle of 0.43 mrad and an interlayer thickness of 53 mils at the thinner end, and was prepared by combining interlayers PVB-3 and PVB-4 to form one interlayer. Alternatively, if desired, PVB-6 interlayer could be formed by using a co-extrusion process with plasticized Resin D and Resin C in a similar manner as used to form PVB-3 except with PVB-6 having a wedge shape. The specific configurations of each of the PVB-1 through PVB-6 interlayers are summarized in Table 4, below.

Figure 12:
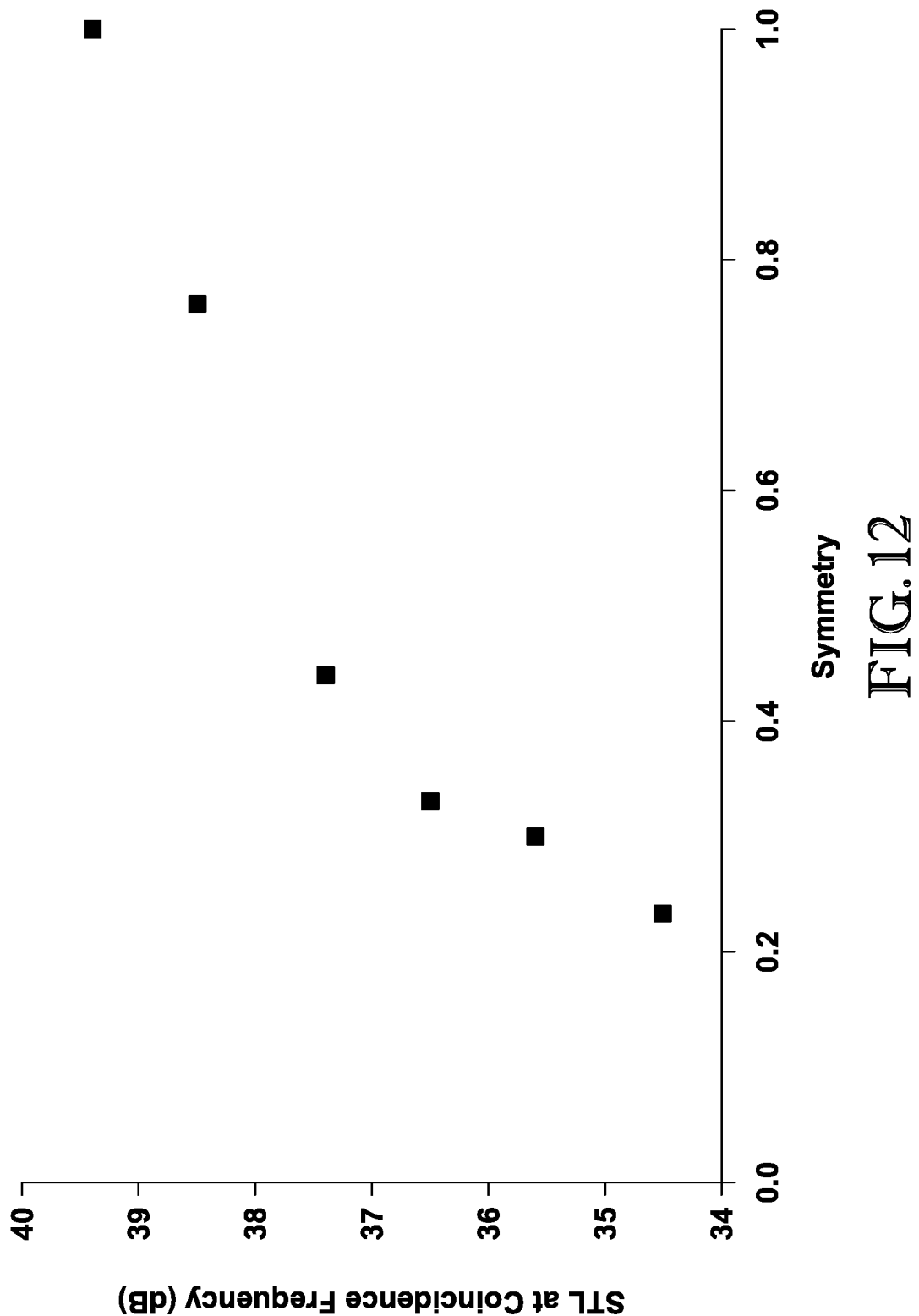
FIG. 12 is a graph of the sound transmission loss at the coincident frequency as a function of glass symmetry for several panels prepared and tested as described in Example 2.

As shown in Table 5, above, there is no clear trend in sound transmission loss for panels LG-11 through LG-19, which utilize the single-layer, non-acoustic PVB-1 interlayer. Panels utilizing the acoustic interlayers, PVB-2 and PVB-3, tend to exhibit decreasing sound transmission loss with glass configurations of reduced symmetry. The sound transmission loss at the coincident frequency as a function of symmetry for panels LG-29 through LG-37, which contain interlayer PVB-3, is also summarized graphically in FIG. 12. As shown in Table 5, above, at a symmetry of 0.23, the sound transmission losses exhibited by panels LG-28 and LG-37 were greater than 34 dB, which is higher than symmetrically configured, non-acoustic panels LG-1 through LG-3. However, further reducing the symmetry of panels formed from PVB-3 (a tri-layer acoustic interlayer) will reduce the sound transmission loss to a value near the sound transmission loss values of panels formed from non-acoustic PVB layers.

TABLE 4

Properties of PVB Interlayers

| | Skin | | | Core | | | | | | |
|---|---|---|---|---|---|---|---|---|---|---|
| Interlayer | Residual Hydroxyl Content (wt %) | Plasticizer Content (phr) | Tg (° C.) | Residual Hydroxyl Content (wt %) | Plasticizer Content (phr) | Tg (° C.) | Core Thickness (mils) | Interlayer Thickness (mils) | Interlayer Plasticizer Content (phr) | Wedge Angle (mrad) |
| PVB-1 | 18.5 | 38 | 30 | — | — | — | — | 30 | 38 | 0 |
| PVB-2 | 18.5 | 38 | 30 | 10.5 | 75 | −2 | 4.5 | 33 | 41 | 0 |
| PVB-3 | 22 | 27 | 42 | 9 | 70 | −2 | 4.5 | 33 | 31.5 | 0 |
| PVB-4 | 18.5 | 38 | 30 | — | — | — | — | 30 | 38 | 0.43 |
| PVB-5 | 18.5 | 38 | 30 | 10.5 | 75 | −2 | 4.5 | 31 | 41 | 0.43 |
| PVB-6 | — | — | — | — | — | — | — | — | — | 0.43 |

Several multiple layer panels were formed by laminating samples of the PVB-1 through PVB-6 interlayers described above between pairs of 500 mm by 800 mm sheets of clear glass of varying thicknesses. The configurations of each of the resulting panels (LG-11 through LG-39) are summarized in Table 5, below. The sound transmission loss at the coincident frequency was determined for each of panels LG-11 through LG-37 according to ASTM E90 at 20° C., and the results are also provided in Table 5, below.

TABLE 5

Sound Transmission Loss at Coincident Frequency for Glass Panels

| Glass Panel | Interlayer | Thickness of Glass Sheet 1 (mm) | Thickness of Glass Sheet 2 (mm) | Combined Thickness (mm) | Symmetry | Coincident Frequency (Hz) | Transmission Loss at Coincident Frequency (dB) |
|---|---|---|---|---|---|---|---|
| LG-11 | PVB-1 | 2.1 | 2.1 | 4.2 | 1 | 3150 | 31.3 |
| LG-12 | PVB-1 | 1.85 | 1.85 | 3.7 | 1 | 4000 | 31.9 |
| LG-13 | PVB-1 | 1.6 | 1.6 | 3.2 | 1 | 4000 | 30.3 |
| LG-14 | PVB-1 | 2.1 | 1.6 | 3.7 | 0.76 | 4000 | 31.8 |
| LG-15 | PVB-1 | 1.9 | 1.25 | 3.15 | 0.66 | 4000 | 30.1 |
| LG-16 | PVB-1 | 1.6 | 0.7 | 2.3 | 0.44 | 5000 | 28.8 |
| LG-17 | PVB-1 | 2.1 | 0.7 | 2.8 | 0.33 | 4000 | 29.0 |
| LG-18 | PVB-1 | 2.3 | 0.7 | 3.0 | 0.30 | 4000 | 29.6 |
| LG-19 | PVB-1 | 3 | 0.7 | 3.7 | 0.23 | 3150 | 30.6 |
| LG-20 | PVB-2 | 2.1 | 2.1 | 4.2 | 1 | 5000 | 38.2 |
| LG-21 | PVB-2 | 1.85 | 1.85 | 3.7 | 1 | 5000-6300 | 38.4 |
| LG-22 | PVB-2 | 1.6 | 1.6 | 3.2 | 1 | 6300 | 38.9 |
| LG-23 | PVB-2 | 2.1 | 1.6 | 3.7 | 0.76 | 5000-6300 | 38.1 |
| LG-24 | PVB-2 | 1.9 | 1.25 | 3.15 | 0.66 | 6300 | 37.1 |
| LG-25 | PVB-2 | 1.6 | 0.7 | 2.3 | 0.44 | 8000 | 36.7 |
| LG-26 | PVB-2 | 2.1 | 0.7 | 2.8 | 0.33 | 6300 | 35.6 |
| LG-27 | PVB-2 | 2.3 | 0.7 | 3.0 | 0.30 | 6300 | 35.6 |
| LG-28 | PVB-2 | 3 | 0.7 | 3.7 | 0.23 | 5000 | 34.1 |
| LG-29 | PVB-3 | 2.1 | 2.1 | 4.2 | 1 | 5000 | 39.3 |
| LG-30 | PVB-3 | 1.85 | 1.85 | 3.7 | 1 | — | — |
| LG-31 | PVB-3 | 1.6 | 1.6 | 3.2 | 1 | 6300 | 39.4 |
| LG-32 | PVB-3 | 2.1 | 1.6 | 3.7 | 0.76 | 5000-6300 | 38.5 |
| LG-33 | PVB-3 | 1.9 | 1.25 | 3.15 | 0.66 | — | — |
| LG-34 | PVB-3 | 1.6 | 0.7 | 2.3 | 0.44 | 8000 | 37.4 |
| LG-35 | PVB-3 | 2.1 | 0.7 | 2.8 | 0.33 | 5000 | 36.5 |
| LG-36 | PVB-3 | 2.3 | 0.7 | 3.0 | 0.30 | 5000 | 35.6 |
| LG-37 | PVB-3 | 3 | 0.7 | 3.7 | 0.23 | 5000 | 34.5 |
| LG-38 | PVB-5 | 1.6 | 0.7 | 2.3 | 0.44 | — | — |
| LG-39 | PVB-6 | 1.6 | 0.7 | 2.3 | 0.44 | — | — |

As shown by a comparison of LG-11 through LG-13, LG-20 through LG-22, and LG-29 through LG-31, the sound transmission loss at the coincident frequency of the panels appears to be independent of glass thickness. For example, each of LG-11 through LG-13, LG-20 through LG-22, and LG-29 through LG-31 have a symmetry of 1, but have combined glass thicknesses of 4.2 mm (LG-11, LG-20, and LG-29), 3.7 mm (LG-12, LG-21, and LG-30), and 3.2 mm (LG-12, LG-22, and LG-31). Despite the differences in combined glass thickness, each of the groups LG-11 through LG-13, LG-20 through LG-22, and LG-29 through LG-31 exhibit a similar sound transmission loss at the coincident frequency. Thus, adjusting the combined glass thickness alone does not appear to sufficiently alter the sound transmission loss of the panels.

Figure 10:
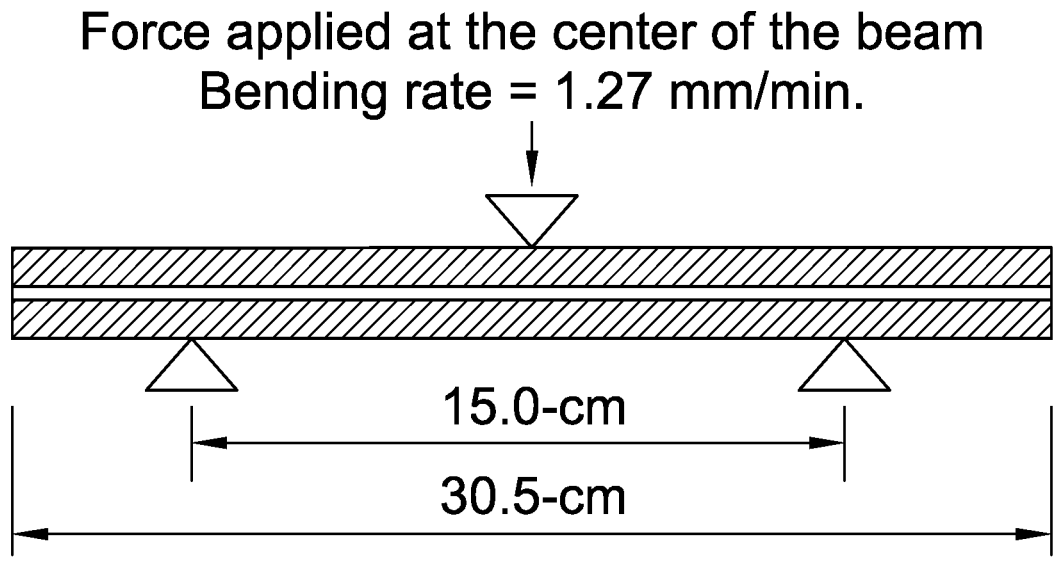
FIG. 10 is a diagram showing the experimental set up used to conduct the three-point bending test.
Figure 11:
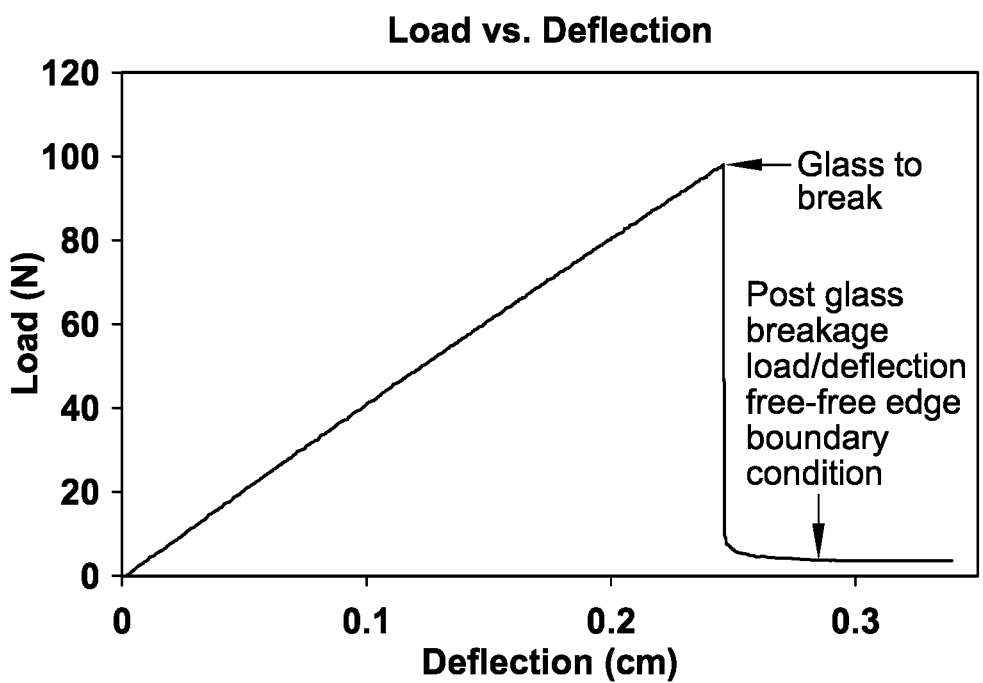
FIG. 11 is a graphical representation of the load versus deflection of a test panel subjected to the three-point bending test.

The deflection stiffness of several of the panels was also tested using the three-point bending test. A diagram of the apparatus used to conduct the three-point bending test is provided in FIG. 10. After being conditioned at a constant humidity of 50% and a temperature of 23° C. for two hours, the test panel was loaded into the apparatus as shown in FIG. 10. Two fixed supports with a span of 15 cm were applied to the underside of the panel, and a third point, a cylindrical rod with a diameter of 0.953 cm and a length of 5.08 cm, was applied at the upper side of the panel, near its center. A force was then applied at the third point to create a constant velocity of about 1.27 mm/min on the test panel. Values for the load on the test panel (in N) and the deflection of the panel (in cm) were recorded. The values were plotted against one another, in a manner similar to the exemplary graph provided in FIG. 11, and the deflection stiffness of the panel was calculated by determining the average slope of the line created by graphing the load versus deflection of the panel prior to the apparent drop in the load, which generally signifies breakage of the panel. The results for the panels tested are summarized in Table 6, below.

TABLE 6

Deflection Stiffness Glass Panels

| Glass Panel | Interlayer | Glass Configuration (mm/mm) | Combined Glass Thickness (mm) | Deflection Stiffness (N/mm) | Coincident Frequency (Hz) | Transmission Loss at Coincident Frequency (dB) |
|---|---|---|---|---|---|---|
| LG-13 | PVB-1 | 1.6/1.6 | 3.2 | 26 | 4000 | 30.3 |
| LG-14 | PVB-1 | 2.1/1.6 | 3.7 | 38 | 4000 | 31.8 |
| LG-11 | PVB-1 | 2.1/2.1 | 4.2 | 54 | 3150 | 31.3 |
| LG-22 | PVB-2 | 1.6/1.6 | 3.2 | 21 | 6300 | 38.9 |
| LG-23 | PVB-2 | 2.1/1.6 | 3.7 | 31 | 5000-6300 | 38.1 |
| LG-20 | PVB-2 | 2.1/2.1 | 4.2 | 48 | 5000 | 38.2 |
| LG-31 | PVB-3 | 1.6/1.6 | 3.2 | 30 | 6300 | 39.4 |
| LG-32 | PVB-3 | 2.1/1.6 | 3.7 | 47 | 5000-6300 | 38.5 |
| LG-29 | PVB-3 | 2.1/2.1 | 4.2 | 58 | 5000 | 39.3 |

As shown in Table 6, above, panels comprising PVB-3, which includes stiffer outer layers, exhibit higher deflection stiffness than panels formed from the PVB-2 or PVB-1 interlayers. Additionally, panels formed from the PVB-3 interlayer also exhibit a higher sound transmission loss at the coincident frequency for all glass configurations as shown in Table 6, above. Accordingly, as shown by, for example, a comparison of LG-31 and LG-23, panels utilizing the PVB-3 interlayer can utilize a lower combined glass thickness (3.2 mm for LG-31 as compared to 3.7 mm for LG-23), while still providing higher sound transmission loss (39.4 dB for LG-31 as compared to 38.1 dB for LG-23) and exhibiting similar deflection stiffness (30 N/cm for LG-31 as compared to 31 N/cm for LG-23).

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:
1. A multiple layer panel comprising:
a first substrate having a first nominal thickness;
a second substrate having a second nominal thickness, wherein said second nominal thickness is at least 0.5 mm less than said first nominal thickness and wherein said second nominal thickness is at least 1.1 mm; and
a multiple layer acoustic interlayer disposed between and in contact with each of said first and second substrates, wherein said multiple layer interlayer comprises—
a first polymer layer comprising a first poly(vinyl acetal) resin and at least one plasticizer;
a second polymer layer comprising a second poly(vinyl acetal) resin and at least one plasticizer; and
a third polymer layer comprising a third poly(vinyl acetal) resin and at least one plasticizer,
wherein said second polymer layer is adjacent to and in contact with each of said first and said third polymer layers such that said second polymer layer is sandwiched between said first and said third polymer layers,
wherein said first, said second, and said third poly(vinyl acetal) resins have respective first, second, and third residual hydroxyl contents, wherein at least one of said first and said third residual hydroxyl contents is at least 20 weight percent, and wherein said second residual hydroxyl content is at least 2 weight percent lower than each of said first and said third residual hydroxyl contents and wherein said interlayer has at least one polymer layer having a glass transition temperature of 25° C. or less,
wherein said first, said second, and said third polymer layers have respective first, second, and third glass transition temperatures, and wherein said second glass transition temperature is at least 13° C. lower than each of said first and said third glass transition temperatures,
wherein the ratio of said second nominal thickness to said first nominal thickness is in the range of from at least

0.23:1 to less than 1:1 and wherein the sum of said first and said second nominal thicknesses is less than 3.7 mm.

2. The multiple layer panel of claim 1, wherein said second nominal thickness is at least 0.5 mm less than said first nominal thickness.

3. The multiple layer panel of claim 1, wherein the ratio of said second nominal thickness to said first nominal thickness is not more than 0.75:1.

4. The multiple layer panel of claim 1, wherein each of said first and said third residual hydroxyl contents is at least 20 weight percent.

5. The multiple layer panel of claim 1, wherein at least one of said first and said third residual hydroxyl contents is at least 22 weight percent.

6. The multiple layer panel of claim 1, wherein multiple layer panel exhibits a sound transmission loss at the coincident frequency, measured according to ASTM E90, of at least 34 dB.

7. The multiple layer panel of claim 1, wherein said interlayer includes at least one tapered zone and wherein the tapered zone has a minimum wedge angle of at least 0.10 mrad.

8. A multiple layer panel comprising:
a first substrate having a first nominal thickness;
a second substrate having a second nominal thickness, wherein said second nominal thickness is at least 0.5 mm less than said first nominal thickness and wherein said second nominal thickness is at least 1.1 mm; and
a multiple layer acoustic interlayer disposed between and in contact with each of said first and second substrates, wherein said multiple layer interlayer comprises—
a first polymer layer comprising a first poly(vinyl acetal) resin and at least one plasticizer;
a second polymer layer comprising a second poly(vinyl acetal) resin and at least one plasticizer; and
a third polymer layer comprising a third poly(vinyl acetal) resin and at least one plasticizer,
wherein said second polymer layer is adjacent to and in contact with each of said first and said third polymer layers such that said second polymer layer is sandwiched between said first and said third polymer layers,
wherein said first, said second, and said third poly(vinyl acetal) resins have respective first, second, and third residual hydroxyl contents, wherein at least one of said first and said third residual hydroxyl contents is at least 20 weight percent, and wherein said second residual hydroxyl content is at least 2 weight percent lower than each of said first and said third residual hydroxyl contents and wherein said interlayer has at least one polymer layer having a glass transition temperature of 25° C. or less,
wherein the ratio of said second nominal thickness to said first nominal thickness is in the range of at least 0.23:1 to less than 1:1, wherein the sum of the first and second nominal thicknesses is less than 3.7 mm, and wherein said multiple layer panel exhibits a sound transmission loss at the coincident frequency, measured according to ASTM E90, of at least 34 dB.

9. The multiple layer panel of claim 8, wherein the ratio of said second nominal thickness to said first nominal thickness is not more than 0.75:1.

10. The multiple layer panel of claim 8, wherein said second nominal thickness is less than 1.5 mm.

11. The multiple layer panel of claim 8, wherein said first, said second, and said third polymer layers have respective first, second, and third glass transition temperatures, and wherein said second glass transition temperature is at least 13° C. lower than each of said first and said third glass transition temperatures.

12. The multiple layer panel of claim 11, wherein each of said two outer polymer layers has a plasticizer content of less than 35 parts per hundred resin (phr) and wherein said inner polymer layer has a plasticizer content at least 10 phr higher than each of said two outer polymer layers.

13. The multiple layer panel of claim 8, wherein at least one layer of said interlayer has a glass transition temperature of at least 40° C.

14. The multiple layer panel of claim 8, wherein said interlayer, when laminated between two sheets of glass each having a thickness of 2.1 mm, has a deflection stiffness of at least 50 N/mm.

15. The multiple layer panel of claim 8, wherein said interlayer includes at least one tapered zone and wherein the tapered zone has a minimum wedge angle of at least 0.10 mrad.

* * * * *